US012359906B2

(12) United States Patent
Ishigaki et al.

(10) Patent No.: US 12,359,906 B2
(45) Date of Patent: Jul. 15, 2025

(54) THREE-DIMENSIONAL MEASUREMENT DEVICE

(71) Applicants: CKD CORPORATION, Aichi (JP); UTSUNOMIYA UNIVERSITY, Tochigi (JP)

(72) Inventors: Hiroyuki Ishigaki, Aichi (JP); Tomoru Okada, Aichi (JP); Ikuo Futamura, Aichi (JP); Takahiro Mamiya, Aichi (JP); Yoshio Hayasaki, Tochigi (JP)

(73) Assignees: CKD CORPORATION, Aichi (JP); UTSUNOMIYA UNIVERSITY, Tochigi (JP)

(*) Notice: Subject to any disclaimer, the term of this patent is extended or adjusted under 35 U.S.C. 154(b) by 88 days.

(21) Appl. No.: 18/354,635

(22) Filed: Jul. 18, 2023

(65) Prior Publication Data

US 2023/0366668 A1    Nov. 16, 2023

Related U.S. Application Data

(63) Continuation of application No. PCT/JP2021/040805, filed on Nov. 5, 2021.

(30) Foreign Application Priority Data

Feb. 25, 2021 (JP) .................. 2021-028628

(51) Int. Cl.
*G01B 9/02001* (2022.01)
*G01B 9/02015* (2022.01)
(Continued)

(52) U.S. Cl.
CPC ..... *G01B 9/02007* (2013.01); *G01B 9/02015* (2013.01); *G01B 9/02027* (2013.01);
(Continued)

(58) Field of Classification Search
CPC ............ G01B 9/02007; G01B 9/02015; G01B 9/02027; G01B 9/02081; G01B 11/2441; G01B 2290/45; G01B 2290/70
See application file for complete search history.

(56) References Cited

U.S. PATENT DOCUMENTS 8,982,357 B2 *   3/2015   Yoshida ............... A61B 5/0073
356/479
2005/0244096 A1 *  11/2005  Jeffers ................ G01B 9/02027
385/15
(Continued)

FOREIGN PATENT DOCUMENTS

JP          6271493 B2     1/2018

OTHER PUBLICATIONS

International Search Report issued in corresponding International Application No. PCT/JP2021/040805, mailed Jan. 11, 2022 (5 pages).
(Continued)

*Primary Examiner* — Michael A Lyons
(74) *Attorney, Agent, or Firm* — Osha Bergman Watanabe & Burton LLP

(57) ABSTRACT

A three-dimensional measurement device includes: an optical system including an optical device that splits an incident light, irradiates a measurement object with a measurement light, irradiates a reference plane with a reference light, and combines at least part of the reflected measurement light with at least part of the reflected reference light to emit a combined light; a first light emitter that emits a first light that has a first wavelength; a second light emitter that emits a second light that has a second wavelength; a first imaging device that takes an image of an output light output from the optical device in which the first light enters; a second imaging device that takes an image of an output light output from the optical device in which the second light enters; and
(Continued)

a control device that executes three-dimensional measurement of the measurement object.

17 Claims, 13 Drawing Sheets

(51) Int. Cl.
    *G01B 9/02055*    (2022.01)
    *G01B 11/24*    (2006.01)

(52) U.S. Cl.
    CPC ...... *G01B 9/02081* (2013.01); *G01B 11/2441* (2013.01); *G01B 2290/45* (2013.01); *G01B 2290/70* (2013.01)

(56) References Cited

U.S. PATENT DOCUMENTS

| | | | |
|---|---|---|---|
| 2013/0113925 A1* | 5/2013 | Kim | G01B 9/02007 348/135 |
| 2018/0106590 A1* | 4/2018 | Ishigaki | G01B 9/02081 |
| 2022/0268569 A1* | 8/2022 | Srocka | G01B 9/02027 |

OTHER PUBLICATIONS

Written Opinion issued in corresponding International Application No. PCT/JP2021/040805, mailed Jan. 11, 2022 (3 pages).
International Preliminary Report on Patentability issued in International Application No. PCT/JP2021/040805; mailed Sep. 7, 2023 (5 pages).

* cited by examiner

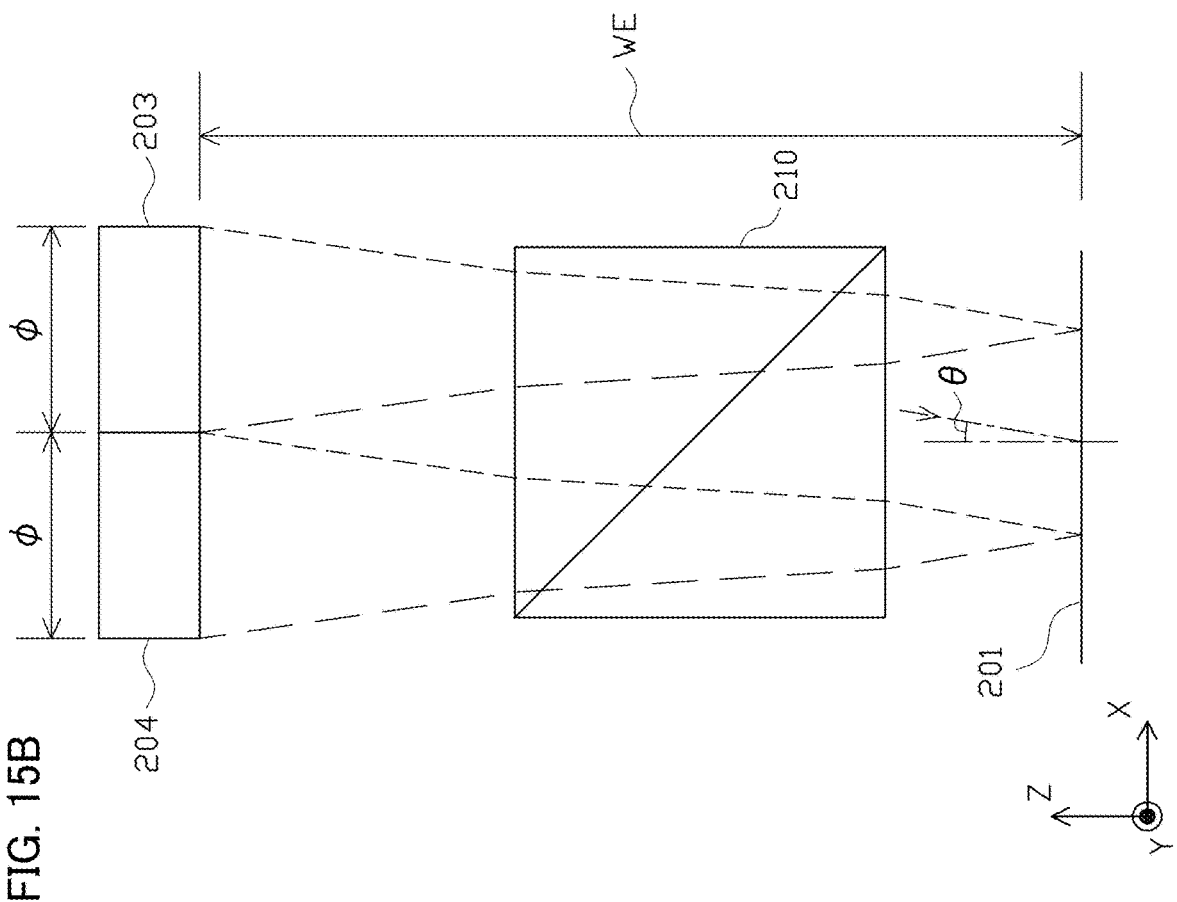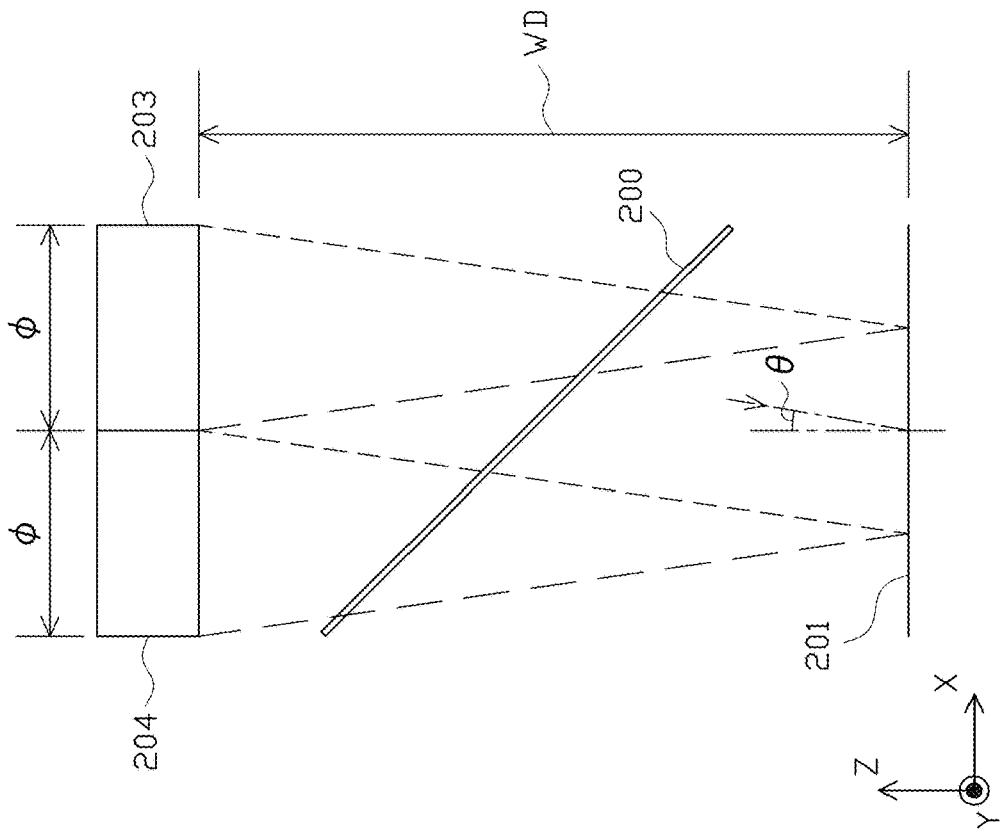

THREE-DIMENSIONAL MEASUREMENT DEVICE

BACKGROUND

Technical Field

The present disclosure relates to a three-dimensional measurement device configured to measure the shape of an object to be measured or a measurement object.

Description of Related Art

Three-dimensional measurement devices using an interferometer have conventionally been known as the three-dimensional measurement device configured to measure the shape of a measurement object. With a view to extending a measurement range, a recently proposed three-dimensional measurement device uses two different types of lights having different wavelengths to perform measurement (as described in, for example, Patent Literature 1).

In the three-dimensional measurement device described in Patent Literature 1, two different types of lights having different wavelengths are made to enter different positions of a polarizing beam splitter. This significantly reduces a wavelength difference between the two different types of lights and thereby significantly extends the measurement range.

A three-dimensional measurement device using an interferometer generally includes a polarizing beam splitter (PBS) 100, a light source 101 configured to emit a coherent light that enters the polarizing beam splitter 100, and an imaging device 102 configured to take an image of light emitted from the polarizing beam splitter 100, as shown in FIG. 16.

In the illustrated example of FIG. 16, a polarized light of a predetermined wavelength (a polarized light that is polarized in a direction inclined at an angle of 45 degrees to an X-axis direction and a Y-axis direction as a polarizing direction) is emitted downward in a Z-axis direction from the light source 101 and enters a first face 100a of the polarizing beam splitter 100.

The light entering the first face 100a of the polarizing beam splitter 100 is branched into two directions at a boundary face 100e of the polarizing beam splitter 100. A P-polarized light component thereof (a linearly polarized light that is polarized in a direction parallel to the sheet surface of FIG. 16 as a polarizing direction) is transmitted downward in the Z-axis direction and is emitted from a third face 100c as a measurement light, while an S-polarized light component thereof (a linearly polarized light that is polarized in the Y-axis direction perpendicular to the sheet surface of FIG. 16 as a polarizing direction) is reflected rightward in the X-axis direction and is emitted from a fourth face 100d as a reference light.

The measurement light (P-polarized light) emitted from the third face 100c of the polarizing beam splitter 100 is transmitted through a quarter-wave plate 103 to be converted into a clockwise circularly polarized light and is then reflected by a work 110. The rotating direction of light is maintained relative to the traveling direction of light. This measurement light is then again transmitted through the quarter-wave plate 103 to be converted from the clockwise circularly polarized light into an S-polarized light and re-enters the third face 100c of the polarizing beam splitter 100.

The reference light (S-polarized light) emitted from the fourth face 100d of the polarizing beam splitter 100 is, on the other hand, transmitted through a quarter-wave plate 104 to be converted into a counterclockwise circularly polarized light and is then reflected by a reference plane 111. The rotating direction of light is maintained relative to the traveling direction of light. This reference light is then again transmitted through the quarter-wave plate 104 to be converted from the counterclockwise circularly polarized light into a P-polarized light and re-enters the fourth face 100d of the polarizing beam splitter 100.

The measurement light (S-polarized light) re-entering the third face 100c of the polarizing beam splitter 100 is reflected leftward in the X-axis direction from the boundary face 100e, while the reference light (P-polarized light) re-entering the fourth face 100d is transmitted through the boundary face 100e leftward in the X-axis direction. Accordingly, a combined light generated by combining the measurement light with the reference light is emitted from a second face 100b of the polarizing beam splitter 100 as an output light.

When the combined light (the measurement light and the reference light) is emitted from the second face 100b of the polarizing beam splitter 100, a quarter-wave plate 105 converts the measurement light component (the S-polarized light component) thereof into a counterclockwise circularly polarized light, while converting the reference light component (the P-polarized light component) thereof into a clockwise circularly polarized light. The counterclockwise circularly polarized light and the clockwise circularly polarized light have different rotating directions and thus do not interfere with each other.

This combined light is subsequently transmitted through a polarizing plate 106, so that the measurement light component and the reference light component thereof interfere with each other in a phase corresponding to the angle of the polarizing plate 106. The imaging device 102 takes images of these interfering lights a plurality of times, with changing the angle of the polarizing plate 106. Three-dimensional measurement of the work 110 is then performed, based on obtained luminance image data.

PATENT LITERATURE

Patent Literature 1: Japanese Patent No. 6271493B

The three-dimensional measurement device described in Patent Literature 1 uses optical members including a polarizing beam splitter and quarter-wave plates to separate and convert the two different types of lights having different wavelengths into polarized light components (P-polarized light and S-polarized light) having different polarizing directions. This allows for separation of the two different types of lights traveling in an identical direction on an identical optical path.

For example, in the configuration described in Patent Literature 1, an S-polarized light component (or a P-polarized light component) with regard to a first light having a wavelength of 1500 nm and a P-polarized light component (or an S-polarized light component) with regard to a second light having a wavelength of 1503 nm are transmitted through an identical quarter-wave plate (for example, a quarter-wave plate 21 or 22 included in an interference optical system 3 described in Patent Literature 1) in an identical direction.

It is, however, difficult to manufacture the optical members required for separation and conversion of the polarized light components (P-polarized light and S-polarized light), for example, the polarizing beam splitter and the quarter-wave plate, with high accuracy. The manufacturing errors of these optical members are likely to significantly affect the accuracy of separation and conversion of the polarized light components.

Especially, it is very difficult to manufacture the quarter-wave plate corresponding to two different wavelengths with high accuracy. In a configuration that a quarter-wave plate (for example, the quarter-wave plate 21 or 22 described in Patent Literature 1) is placed at a position which two different types of lights having different wavelengths pass through, as in Patent Literature 1, at least one of the two different types of lights passing therethrough is likely to have a conversion error.

The quarter-wave plate is an optical member serving to give a phase difference of a ¼ wavelength (for example, 375 nm or 375.75 nm) to an incident light of a predetermined wavelength (for example, 1500 nm or 1503 nm) and to convert a linearly polarized light into a circularly polarized light and convert a circularly polarized light into a linearly polarized light.

Accordingly, manufacturing a quarter-wave plate corresponding to the first light having the wavelength of 1500 nm and the second light having the wavelength of 1503 nm means manufacturing a quarter-wave plate serving to give a desired phase difference (for example, 375.6 nm) in a range of 375 nm to 375.75 nm.

In the configuration that the polarized light components pass through the quarter-wave plate back and forth to be converted from the S-polarized light into the P-polarized light or from the P-polarize light into the S-polarized light, as in the configuration of Patent Literature 1, there is accordingly a possibility that the polarized light components are not completely converted and that a small amount of remaining unconverted polarized light component (for example, S-polarized light component) is mixed with a converted polarized light component (for example, P-polarized light component).

In this case, as shown in FIG. 16, the polarized light component that is not completely converted is reflected by or transmitted through the boundary face 100e of the polarizing beam splitter 100 as return light Kp or Ks and is led to a different direction that is different from an originally expected direction.

In the configuration of Patent Literature 1 that takes images of interfering lights of a measurement light (S-polarized light) and a reference light (P-polarized light) with regard to the first light and images of interfering lights of a measurement light (P-polarized light) and a reference light (S-polarized light) with regard to the second light by different cameras, return light of the second light (or the first light) may enter the first camera (or the second camera) that is supposed to take images of only the interfering lights with regard to the first light (or the second light). The first camera (or the second camera) may accordingly take images of interfering lights including the return light. This is likely to decrease the measurement accuracy.

SUMMARY

By taking into account the circumstances described above, one or more embodiments of the present disclosure provide a three-dimensional measurement device that achieves, for example, improvement of the measurement accuracy.

The following describes each of various aspects of the present disclosure. Functions and advantageous effects that are characteristic of each of the aspects are also described as appropriate.

Aspect 1. There is provided a three-dimensional measurement device comprising: a predetermined optical system (a specific optical system) provided with an optical unit or optical device (for example, a beam splitter or a half mirror), which is configured to split an incident light into two split lights, the predetermined optical system being configured to irradiate a measurement object with a measurement light that is at least part of one of the two split lights, to irradiate a reference plane with a reference light that is at least part of another of the two split lights, to combine at least part of the measurement light reflected by the measurement object with at least part of the reference light reflected by the reference plane, and to emit a combined light; a first irradiation unit (i.e., first light emitter) configured to emit a first light that has a first wavelength and that enters a first input portion of the optical unit, wherein the measurement object is irradiated with a first measurement light and the reference plane is irradiated with a first reference light once the first light enters the first input portion; a second irradiation unit (i.e., second light emitter) configured to emit a second light that has a second wavelength and that enters a second input portion of the optical unit, wherein the measurement object is irradiated with a second measurement light and the reference plane is irradiated with a second reference light once the second light enters the second input portion; a first imaging unit (i.e., first imaging device) configured to take an image of a predetermined output light that is output from a first output portion of the optical unit once the first light enters the first input portion, and obtains first image data; a second imaging unit (i.e., second imaging device) configured to take an image of a predetermined output light that is output from a second output portion of the optical unit once the second light enters the second input portion, and obtains second image data; and an image processing unit (i.e., control device) configured to execute three-dimensional measurement of the measurement object, based on the first and second image data obtained by the first imaging unit and by the second imaging unit. The optical unit and the first and second irradiation unit are disposed such that: a traveling direction (vector) of the first measurement light output from the optical unit and directed to the measurement object is different from a traveling direction (vector) of the second measurement light output from the optical unit and directed to the measurement object, and a traveling direction (vector) of the first reference light output from the optical unit and directed to the reference plane is different from a traveling direction (vector) of the second reference light output from the optical unit and directed to the reference plane. Further, a traveling direction (vector) of the first measurement light reflected by the measurement object and directed to the optical unit is different from a traveling direction (vector) of the second measurement light reflected by the measurement object and directed to the optical unit, and a traveling direction (vector) of the first reference light reflected by the reference plane and directed to the optical unit is different from a traveling direction (vector) of the second reference light reflected by the reference plane and directed to the optical unit. The optical unit is configured to combine part of the first measurement light reflected by the measurement object with part of the first reference light reflected by the reference plane and to emit a combined light from the first output portion, and configured to combine part of the second measurement light reflected by the measurement object with part of the second reference light reflected by the reference plane and to emit a combined light from the second output portion.

In the configuration of Aspect 1 described above, there is no section where the traveling directions (vectors) of the first light and the second light from the respective irradiation units to the respective imaging units overlap with each other. Accordingly, the first light and the second light entering the predetermined optical system do not interfere with each other but are separately emitted from the predetermined optical system in the completely separated state. No significant problem arises even in the case where the optical paths having reverse traveling directions overlap with each other or where the optical paths intersect with each other.

As described above, the configuration of this aspect enables the first light and the second light to be treated completely separately from each other by only appropriately setting the positions of incidence and the angles of incidence of the first light and the second light relative to the optical system. This significantly reduces optical members such as polarizing beam splitters and quarter-wave plates required for separation and conversion of polarized light components (P-polarized light and S-polarized light) and simplifies the configuration. Especially, this provides an optical system with omission of a quarter-wave plate which causes polarized light components of two different types of lights having different wavelengths to pass through on an identical optical path in an identical direction.

As a result, this configuration eliminates the influence of a manufacturing error or the like caused by a predetermined optical member, for example, the influence of return line described above, and enhances the measurement accuracy.

This configuration enables two different types of lights having close wavelengths to be used as the first light and the second light and further extends the measurement range in three-dimensional measurement. Furthermore, this configuration enables imaging of the output light with regard to the first light to be performed simultaneously with imaging of the output light with regard to the second light and thereby improves the measurement efficiency.

Aspect 2. The three-dimensional measurement device described in above Aspect 1 may further comprise a first polarizing plate that is disposed between the optical unit and the reference plane and configured to transmit a first reference polarized light (for example, P-polarized light) once the first reference light enters the first polarized plate, and transmit a second reference polarized light (for example, P-polarized light) once the second reference light enters the first polarized plate; a second polarizing plate that is disposed between the optical unit and the measurement object and configured to transmit a first measurement polarized light (for example, S-polarized light) once the first measurement light enters the second polarized plate, and transmits a second measurement polarized light (for example, S-polarized light) once the second measurement light enters the second polarized plate; a first quarter-wave plate that is disposed between the first output portion of the optical unit and the first imaging unit and configured to convert the first reference polarized light and the first measurement polarized light into first circularly polarized lights; and a second quarter-wave plate that is disposed between the second output portion of the optical unit and the second imaging unit and configured to convert the second reference polarized light and the second measurement polarized light into second circularly polarized lights.

The configuration of above Aspect 2 enables three-dimensional measurement to be performed by a phase shift method and further enhances the measurement accuracy.

The "first quarter-wave plate" used may be a dedicated quarter-wave plate manufactured according to the first wavelength of the first light, and the "second quarter-wave plate" used may be a dedicated quarter-wave plate manufactured according to the second wavelength of the second light. This configuration reduces the conversion error of light, compared with a configuration using quarter-wave plates corresponding to two different wavelengths. As a result, this configuration enhances the measurement accuracy.

Aspect 3. In the three-dimensional measurement device described in above Aspect 1 or above Aspect 2, an optical path of the first measurement light output from the optical unit and directed to the measurement object and an optical path of the second measurement light output from the optical unit and directed to the measurement object may be symmetric about a predetermined axis (for example, a Z axis) perpendicular to the measurement object, when viewed in a direction of the predetermined axis; and an optical path of the first reference light output from the optical unit and directed to the reference plane and an optical path of the second reference light output from the optical unit and directed to the reference plane may be symmetric about a predetermined axis (for example, an X axis) perpendicular to the reference plane, when viewed in a direction of the predetermined axis.

The configuration of above Aspect 3 reduces the possibility that the measurement light with regard to the first light and the measurement light with regard to the second light directed from the optical unit to the measurement object are mixed with each other, compared with, for example, a configuration that the optical path of the measurement light with regard to the first light overlaps with the optical path of the measurement light with regard to the second light, when being viewed in the direction of the predetermined axis perpendicular to the measurement object. Similarly, this configuration also reduces the possibility that the reference light with regard to the first light and the reference light with regard to the second light directed from the optical unit to the reference plane are mixed with each other. As a result, this configuration further enhances the measurement accuracy.

Aspect 4. In the three-dimensional measurement device described in any of above Aspects 1 to 3, an incident angle of the first measurement light with respect to the measurement object may be equal to an incident angle of the second measurement light with respect to the measurement object; and an incident angle of the first reference light with respect to the reference plane may be equal to an incident angle of the reference light with respect to the reference plane.

The configuration of above Aspect 4 enables the optical path length of the first light and the optical path length of the second light to be equal to each other. As a result, this configuration enables imaging of the measurement object to be performed in the same size (with the same magnification) in an imaging process with regard to the first light and in an imaging process with regard to the second light. This accordingly enhances the measurement accuracy.

Aspect 5. In the three-dimensional measurement device described in any of above Aspects 1 to 4, the optical unit may be a half mirror.

The configuration of above Aspect 5 uses a thin plate-like half mirror that substantially has no need to take into account the refraction, compared with a thick optical unit or optical device such as a beam splitter, and thereby achieves further downsizing of the three-dimensional measurement device.

For example, as shown in FIG. 15A, in the case where a half mirror 200 is used as the optical unit, a lower limit value of an angle of incidence θ to a measurement object 201 may be defined by Expression (1) given below:

$$\theta \geq \tan^{-1}(\phi/2WD) \qquad (1)$$

where "φ" denotes a diameter (width) of laser beam that is emitted from a light source 203, that is reflected by the measurement object 210 and that enters an imaging element 204; and "WD" denotes a minimum required distance between the light source 203 (the imaging element 204) and the measurement object 201, in order to prevent the location of the light source 203 from overlapping with the location of the imaging element 204.

As shown in FIG. 15B, in the case where a beam splitter 210 is used as the optical unit, on the other hand, there is a need to take into account the refraction of light and the like in the beam splitter 210. Expression (1) given above is thus not applicable to this case. If light is made to enter the measurement object 201 at the angle of incidence θ as in the case of using the half mirror 200, in order to prevent the location of the light source 203 from overlapping with the location of the imaging element 204, it is required to set a longer distance WE between the light source 203 (the imaging element 204) and the measurement object 201 than the distance WD in the case of using the half mirror 200.

Aspect 6. The control device of the three-dimensional measurement device described in above Aspect 1 may be configured to execute three-dimensional measurement of the measurement object by a Fourier transform method that obtains a complex amplitude of each of the first and second measurement lights, based on the first and second image data (interference fringe images) each obtained by taking an image of a carrier fringe that is generated in a predetermined positional relationship between the optical unit and the reference plane.

The "predetermined positional relationship between the optical unit and the reference plane" includes, for example, "inclination of the reference plane from a predetermined reference attitude". This "reference attitude" includes, for example, such an attitude that the "reference plane" is orthogonal to a second axis (for example, an X axis), which is perpendicular to a first axis (for example, a Z axis) that is orthogonal to the measurement object, in the case where the "optical unit or optical device (for example, a beam splitter or a half mirror)" is placed with an inclination of 45 degrees to the first axis and to the second axis.

The configuration of above Aspect 6 does not require any optical member used for separation and conversion of polarized light components (P-polarized light and S-polarized light), such as the quarter-wave plate and the polarizing plate employed in above Aspect 2, as well as the polarizing beam splitter. Additionally, there is no need to use a polarization image sensor as the imaging element of the imaging unit.

As a result, this reduces the number of required components and simplifies the configuration. Additionally, this configuration eliminates the influence of a manufacturing error or the like caused by the optical member and enhances the measurement accuracy.

BRIEF DESCRIPTION OF DRAWINGS

FIG. 15A is a schematic diagram illustrating optical paths and the like of an incident light and a reflected light of a measurement object in a configuration using a half mirror; and FIG. 15B is a schematic diagram illustrating optical paths and the like of an incident light and a reflected light of the measurement object in a configuration using a beam splitter.

DETAILED DESCRIPTION OF EMBODIMENTS

First Embodiment

Figure 1:
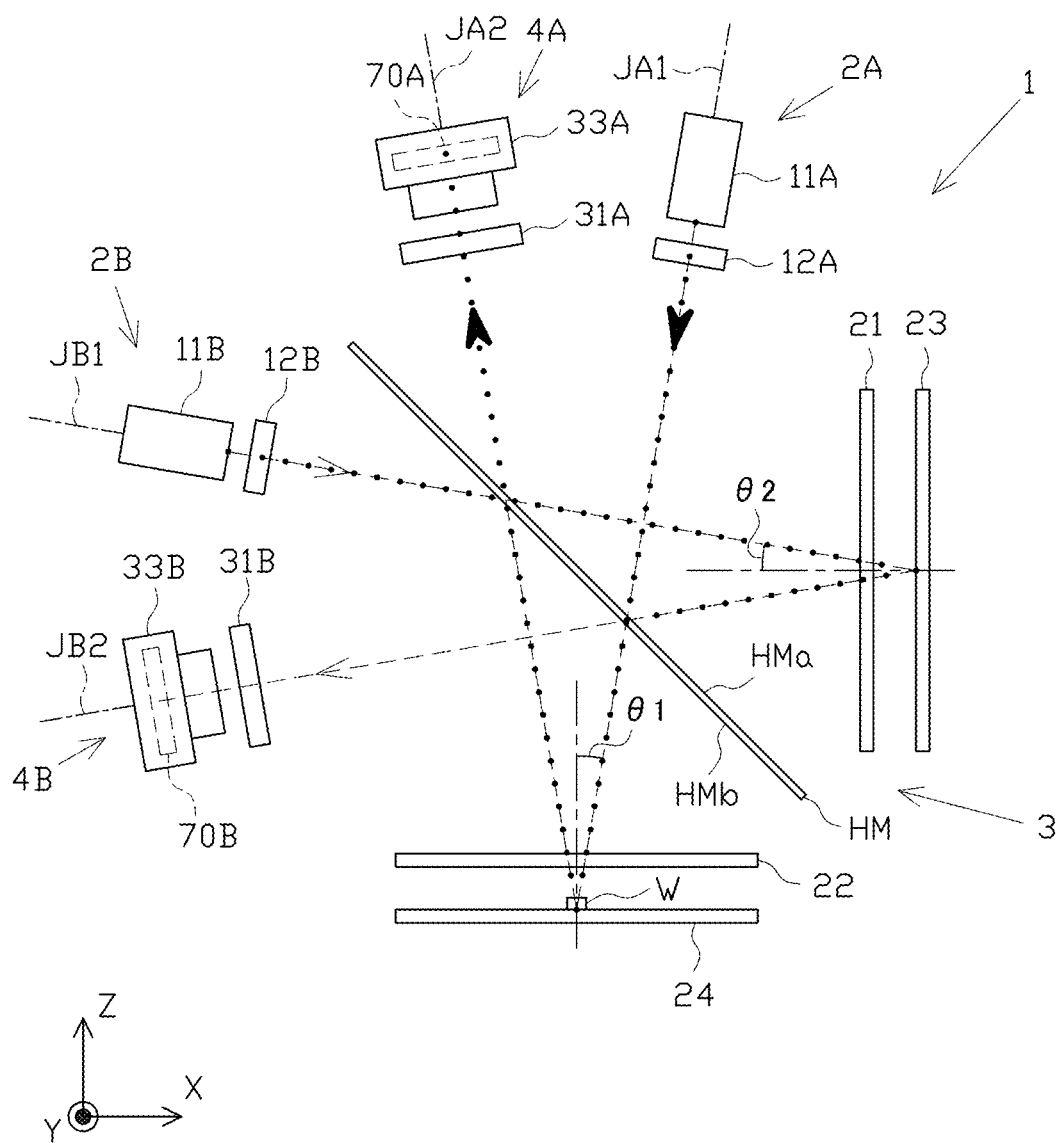
FIG. 1 is a schematic configuration diagram illustrating a three-dimensional measurement device according to a first embodiment.
Figure 2:
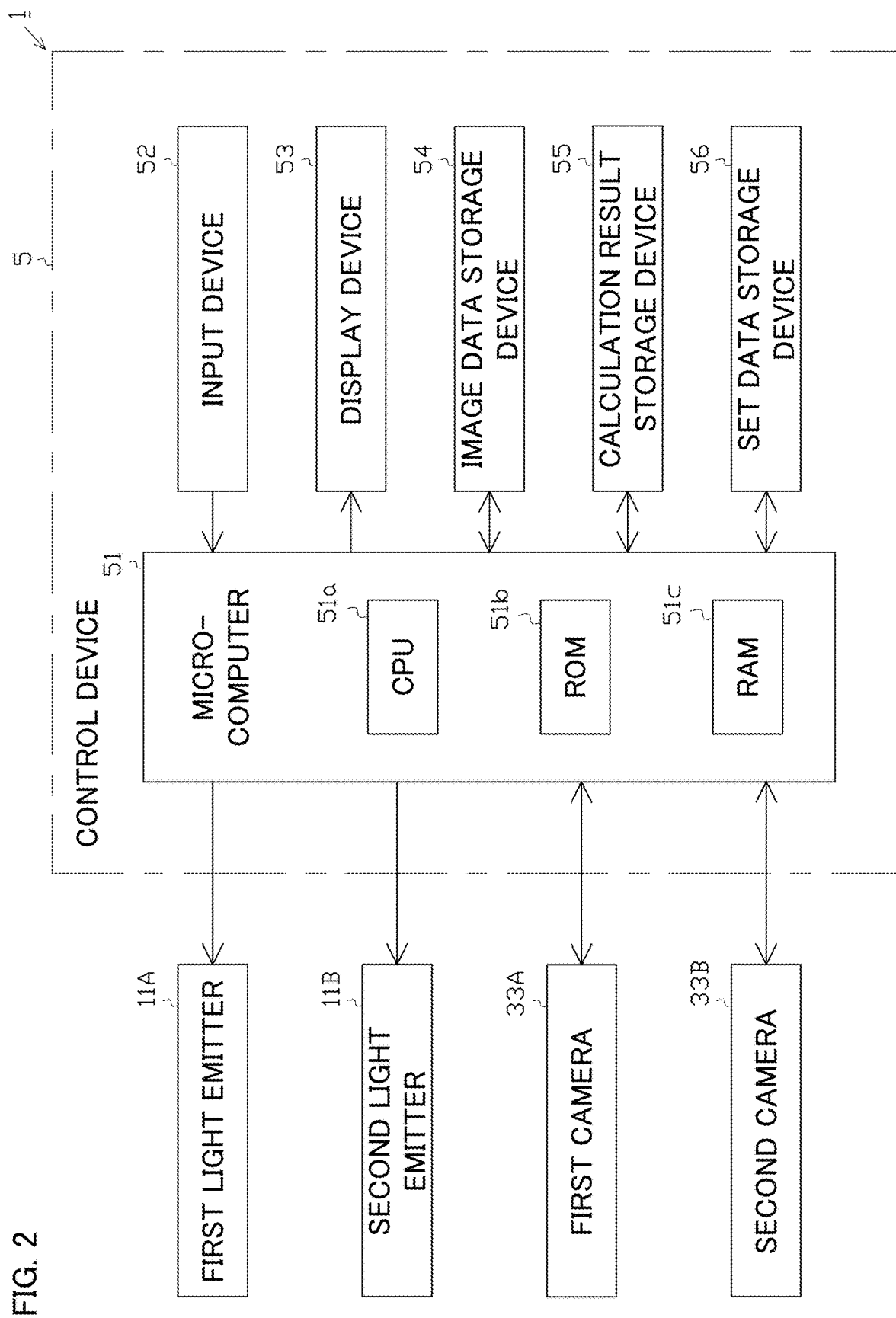
FIG. 2 is a block diagram illustrating the electrical configuration of the three-dimensional measurement device.

The following describes one embodiment of the three-dimensional measurement device with reference to the drawings. FIG. 1 is a schematic diagram illustrating the schematic configuration of a three-dimensional measurement device 1 according to one embodiment. FIG. 2 is a block diagram illustrating the electrical configuration of the three-dimensional measurement device 1. In the description below, for the purpose of convenience, a left-right or horizontal direction on a sheet surface of FIG. 1 is called an "X-axis direction", a front-back direction on the sheet surface is called a "Y-axis direction", and a vertical direction on the sheet surface is called a "Z-axis direction".

The three-dimensional measurement device 1 is configured on the principle of an interferometer and includes two projection optical systems 2A and 2B (first projection optical system 2A and second projection optical system 2B) configured to output lights of specific wavelengths; an interference optical system 3 configured to receive incident lights respectively emitted from the projection optical systems 2A and 2B; two imaging systems 4A and 4B (first imaging system 4A and second imaging system 4B) configured to take images of the light emitted from the interference optical system 3; and a control device 5 (shown in FIG. 2) configured to perform various controls, image processing, arithmetic operations, and the like relating to, for example, the projection optical systems 2A and 2B, the interference optical system 3 and the imaging systems 4A and 4B.

The "control device 5" configures the "image processing unit" according to the embodiment, and the "interference optical system 3" configures the "predetermined optical system (specific optical system)" according to the embodiment. In the description of the embodiment, an optical system that splits predetermined incident light into two split lights (measurement light and reference light), makes an optical path difference between the two split lights, recombines the two split lights to recombined light, and outputs the recombined light for the purpose of causing interference of light (taking an image of interfering light) is called the "interference optical system". In other words, an optical system that outputs two lights as combined light without interfering with each other inside thereof is also called the "interference optical system". Accordingly, in the case where two lights (measurement light and reference light) are output as combined light from the "interference optical system" without interfering with each other like this embodiment, the combined light is to be converted into interfering light via a predetermined interference unit at least in a previous stage prior to imaging.

The configuration of the two projection optical systems 2A and 2B (the first projection optical system 2A and the second projection optical system 2B) are described first in detail. The first projection optical system 2A includes, for example, a first light emitter 11A and a first light isolator 12A. The "first light emitter 11A" configures the "first irradiation unit" according to the embodiment.

Although not being specifically illustrated, the first light emitter 11A includes, for example, a laser light source configured to output linearly polarized light having a specific wavelength $\lambda 1$, a beam expander configured to expand the linearly polarized light output from the laser light source and output the expanded linearly polarized light as parallel light, a polarizing plate configured to adjust the intensity, and a half-wave plate configured to adjust the polarizing direction.

An optical axis (direction of emission of light) JA1 of the first light emitter 11A according to the embodiment is inclined rightward at an angle $\theta 1$ to the Z-axis direction. According to the embodiment under this configuration, linearly polarized light that is polarized in a direction inclined at an angle of 45 degrees to the X-axis direction and the Y-axis direction as a polarizing direction and that has a wavelength $\lambda 1$ (for example, $\lambda 1=1500$ nm) is emitted from the first light emitter 11A toward the interference optical system 3. The "wavelength $\lambda 1$" corresponds to the "first wavelength" according to the embodiment. In the description below, the light that is emitted from the first light emitter 11A and that has the wavelength $\lambda 1$ is called "first light".

The first light isolator 12A is an optical element that causes only light traveling in one direction (toward the interference optical system 3-side according to the embodiment) to be transmitted, while blocking light traveling in an opposite direction (toward the first light emitter 11A-side according to the embodiment). This configuration allows for transmission of only the first light emitted from the first light emitter 11A and prevents the first light emitter 11A from being damaged, destabilized or the like by the incident light.

In the embodiment, linearly polarized light that is polarized in a direction parallel to the sheet surface of FIG. 1 (X-Z plane) as the polarizing direction is called P-polarized light (P-polarized light component), and linearly polarized light that is polarized in the Y-axis direction perpendicular to the sheet surface of FIG. 1 as the polarizing direction is called S-polarized light (S-polarized light component).

Like the first projection optical system 2A described above, the second projection optical system 2B includes, for example, a second light emitter 11B and a second light isolator 12B. The "second light emitter 11B" configures the "second irradiation unit" according to the embodiment.

Like the first light emitter 11A described above, the second light emitter 11B includes, for example, a laser light source configured to output linearly polarized light having a specific wavelength $\lambda 2$, a beam expander configured to expand the linearly polarized light output from the laser light source and output the expanded linearly polarized light as parallel light, a polarizing plate configured to adjust the intensity, and a half-wave plate configured to adjust the polarizing direction.

An optical axis (direction of emission of light) JB1 of the second light emitter 11B according to the embodiment is inclined upward at an angle $\theta 2$ to the X-axis direction. According to the embodiment, the angle $\theta 2$ is set equal to the angle $\theta 1$ described above.

According to the embodiment under this configuration, linearly polarized light that is polarized in a direction inclined at an angle of 45 degrees to the X-axis direction and the Y-axis direction as a polarizing direction and that has a wavelength $\lambda 2$ (for example, $\lambda 2=1503$ nm) is emitted from the second light emitter 11B toward the interference optical system 3. The "wavelength $\lambda 2$" corresponds to the "second wavelength" according to the embodiment. In the description below, the light that is emitted from the second light emitter 11B and that has the wavelength $\lambda 2$ is called "second light".

Like the first light isolator 12A described above, the second light isolator 12B is an optical element that causes only light traveling in one direction (toward the interference optical system 3-side according to the embodiment) to be transmitted, while blocking light traveling in an opposite direction (toward the second light emitter 11B-side according to the embodiment). This configuration allows for transmission of only the second light emitted from the second light emitter 11B and prevents the second light emitter 11B from being damaged, destabilized or the like by the incident light.

The following describes the configuration of the interference optical system 3 in detail. The interference optical system 3 includes, for example, a half mirror HM, polarizing plates 21 and 22, a reference plane 23 and a mounting portion 24.

The half mirror HM is a known thin plate-like optical member serving to split incident light including a polarization state thereof into transmitted light and reflected light at a predetermined ratio (1:1 according to the embodiment) and configures the optical unit according to the embodiment.

This configuration splits the incident light into a P-polarized light component and an S-polarized light component of transmitted light and a P-polarized light component and an S-polarized light component of reflected light all at identical rates, with keeping the respective polarization states of the transmitted light and the reflected light identical with the polarization state of the incident light.

The half mirror HM is arranged such that both a surface and a rear face thereof are parallel to the Y-axis direction and are inclined at 45 degrees to the λ-axis direction and the Z-axis direction. In the following description of the embodiment, an upper face of the half mirror HM which the first light emitted from the first projection optical system 2A (the first light emitter 11A) enters is referred to as "first face HMa", and a lower face of the half mirror HM which the second light emitted from the second projection optical system 2B (the second light emitter 11B) enters is referred to as "second face HMb".

In the interference optical system 3, the polarizing plate 21 is arranged to be opposed to the first face HMa of the half mirror HM in the X-axis direction, and the reference plane 23 is arranged to be opposed to the polarizing plate 21 in the X-axis direction. The polarizing plate 21 and the reference plane 23 are arranged to be perpendicular to the X-axis direction (to make the X-axis direction as a normal direction).

The polarizing plate 21 according to the embodiment is arranged such as to transmit only the P-polarized light as first polarized light and to block the S-polarized light. More specifically, only a P-polarized light component of light emitted from the first face HMa of the half mirror HM is transmitted through the polarizing plate 21 and is radiated to the reference plane 23 as reference light. The reference light (P-polarized light) reflected from the reference plane 23 is again transmitted through the polarizing plate 21 and enters the first face HMa of the half mirror HM. The "polarizing plate 21" configures the "first polarizing plate" according to the embodiment.

Furthermore, in the interference optical system 3, the polarizing plate 22 is arranged to be opposed to the second face HMb of the half mirror HM in the Z-axis direction, and the mounting portion 24 is arranged to be opposed to the polarizing plate 22 in the Z-axis direction. The polarizing plate 22 and the mounting portion 24 are arranged to be perpendicular to the Z-axis direction (to make the Z-axis direction as a normal direction).

The polarizing plate 22 according to the embodiment is arranged such as to transmit only the S-polarized light as second polarized light and to block the P-polarized light. More specifically, only an S-polarized light component of light emitted from the second face HMb of the half mirror HM is transmitted through the polarizing plate 22 and is radiated to a work W that is an object to be measured or a measurement object placed on the mounting portion 24, as measurement light. The measurement light (S-polarized light) reflected from the work W is again transmitted through the polarizing plate 22 and enters the second face HMb of the half mirror HM. The "polarizing plate 22" configures the "second polarizing plate" according to the embodiment.

The following describes the configuration of the two imaging systems 4A and 4B (the first imaging system 4A and the second imaging system 4B) in detail.

The first imaging system 4A includes, for example, a quarter-wave plate 31A and a first camera 33A. The "first camera 33A" configures the "first imaging unit" according to the embodiment.

The quarter-wave plate 31A serves to respectively convert a reference light component (P-polarized light component) and a measurement light component (S-polarized light component) of the first light emitted from the first face HMa of the half mirror HM into circularly polarized lights, and configures the "first quarter-wave plate" according to the embodiment. The quarter-wave plate 31A is a quarter-wave plate specifically designed for the wavelength $\lambda 1$ (for example, $\lambda 1=1500$ nm) of the first light.

The first camera 33A according to the embodiment is a polarization camera provided with a polarization image sensor 70A as an imaging element. The first camera 33A according to the embodiment has an optical axis (direction of incidence of a combined light with regard to the first light) JA2 that is inclined leftward at an angle $\theta 1$ to the Z-axis direction.

Figure 5:
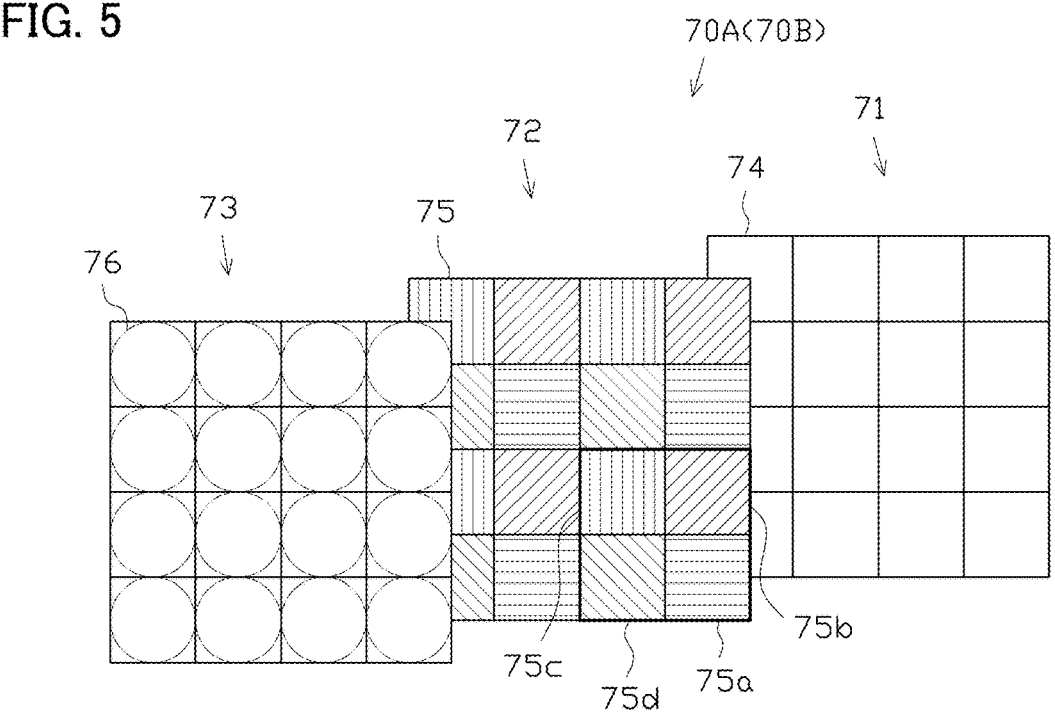
FIG. 5 is a schematic configuration diagram illustrating a polarization image sensor.

As shown in FIG. 5, the polarization image sensor 70A includes a light-receiving element array 71 serving as a sensor main body, a polarizer array 72 provided on a light-receiving face side or a front face side of the light-receiving element array 71, and a microlens array 73 provided on a front face side of the polarizer array 72.

The light-receiving element array 71 has a semiconductor element structure of, for example, a general CCD image sensor and has a plurality of light-receiving elements (pixels) 74 that are two-dimensionally arrayed in a matrix form.

The light-receiving element array 71 is actually an array of a large number of pixels (for example, 1280×1024 pixels). For the purpose of simplicity of explanation, however, only a 4-by-4 matrix that is part of the light-receiving element array 71 is illustrated in FIG. 5 (the same applies to the polarizer array 72 and the microlens array 73).

The polarizer array 72 has a plurality of polarizers 75 that are two-dimensionally arrayed in a matrix form. Each of the polarizers 75 is provided to be one-to-one mapped to each of the light-receiving elements 74 of the light-receiving element array 71.

The polarizer 75 is configured to selectively transmit the reference light component and the measurement light component that are converted into the circularly-polarized lights as described above. This configuration causes the reference light component and the measurement light component having different rotating directions to interfere with each other. This configuration also provides the reference light component and the measurement light component with a predetermined phase difference. Accordingly, each of the polarizers 75 may be regarded to configure the "phase shift unit" or the "interference unit" according to the embodiment.

The polarizers 75 include four different types of polarizers 75a, 75b, 75c and 75d that have different set angles of transmission axes differing by 45 degrees each. More specifically, the polarizers 75 include first polarizers 75a set to have the set angle of "0 degree" of the transmission axis relative to a reference line (horizontal line), second polarizers 75b set to have the set angle of "45 degrees" of the transmission axis, third polarizers 75c set to have the set angle of "90 degrees" of the transmission axis and fourth polarizers 75d set to have the set angle of "135 degrees" of the transmission axis.

This configuration enables the reference light component and the measurement light component of the light transmitted through each of the polarizers 75 of the polarizer array 72 to interfere with each other in four different phase differences. Accordingly, this configuration generates four different interfering lights that have phase differences between the reference light and the measurement light differing by 90 degrees each.

Concrete settings are designed to give a phase shift amount of "0 degree" with regard to the reference light component of the light transmitted through the first polarizers 75a, a phase shift amount of "90 degrees" with regard to the reference light component of the light transmitted through the second polarizers 75b, a phase shift amount of "180 degrees" with regard to the reference light component of the light transmitted through the third polarizers 75c and a phase shift amount of "270 degrees" with regard to the reference light component of the light transmitted through the fourth polarizers 75d.

The polarizer array 72 is configured such that a specific polarizer array pattern (shown as a thick frame part in FIG. 5), where these four different polarizers 75a, 75b, 75c and 75d having the different angles of the transmission axes are arrayed in a predetermined sequence in a 2-by-2 matrix, is repeated in matrix.

The polarizer array pattern according to the embodiment is configured to include the first polarizer 75a located at a lower right position, the second polarizer 75b located at an upper right position, the third polarizer 75c located at an upper left position and the fourth polarizer 75d located at a lower left position, in a front view of the polarizer array 72.

When four polarizers 75 arrayed in a 2-by-2 matrix are extracted from any position in the polarizer array 72, the extracted array certainly includes respective ones of the four different polarizers 75a, 75b, 75c and 75d having different angles of transmission axes.

The microlens array 73 has a plurality of microlenses 76 that are two-dimensionally arrayed in a matrix form. Each of the microlenses 76 serves to enhance the light collecting efficiency of each pixel and is provided to be one-to-one mapped to each of the polarizers 75 in the polarizer array 72.

The light collected by each of the microlenses 76 in the microlens array 73 passes through each corresponding polarizer 75 in the polarizer array 72. This provides each reference light component and each measurement light component thereof with each predetermined phase difference to give an interfering light and causes the interfering light to be received by each corresponding light-receiving element 74 in the light-receiving array 71.

Luminance image data taken and obtained by the first camera 33A are converted into digital signals inside of the first camera 33A and are input in the form of the digital signals into the control device 5 (an image data storage device 54).

Like the first imaging system 4A, the second imaging system 4B includes, for example, a quarter-wave plate 31B and a second camera 33B. The "second camera 33B" configures the "second imaging unit" according to the embodiment.

The quarter-wave plate 31B is configured to respectively convert a reference light component (P-polarized light component) and a measurement light component (S-polarized light component) of the second light emitted from the second face HMb of the half mirror HM into circularly polarized lights, and configures the "second quarter-wave plate" according to the embodiment. The quarter-wave plate 31B is a quarter-wave plate specifically designed for the wavelength $\lambda 2$ (for example, $\lambda 2=1503$ nm) of the second light.

Like the first camera 33A, the second camera 33B according to the embodiment is a polarization camera provided with a polarization image sensor 70B as an imaging element.

The second camera 33B according to the embodiment has an optical axis (direction of incidence of a combined light with regard to the second light) JB2 that is inclined downward at an angle $\theta 2$ to the $\lambda$-axis direction. The polarization image sensor 70B has a configuration identical with that of the polarization image sensor 70A included in the first camera 33A and is thus not described in detail.

As in the case of the first camera 33A, luminance image data taken and obtained by the second camera 33B are converted into digital signals inside of the second camera 33B and are input in the form of the digital signals into the control device 5 (the image data storage device 54).

The following describes the electrical configuration of the control device 5. As shown in FIG. 2, the control device 5 includes a microcomputer 51 configured to control the entire three-dimensional measurement device 1, an input device 52 serving as the "input unit" configured by a keyboard and a mouse or a touch panel, a display device 53 serving as the "display unit" having a display screen such as a liquid crystal screen, an image data storage device 54 configured to successively store luminance image data and the like taken and obtained by the cameras 33A and 33B, a calculation result storage device 55 configured to store the results of various calculations, and a set data storage device 56 configured to store in advance various pieces of information.

The microcomputer 51 includes, for example, a CPU 51a serving as a computing unit, a ROM 51b configured to store various programs, and a RAM 51c configured to temporarily store various data, for example, calculation data and input/output data, and is electrically connected with the respective devices 52 to 56 described above.

The following describes the functions of the three-dimensional measurement device 1. According to the embodiment, as described later, radiation of the first light and radiation of the second light are performed simultaneously, and an optical path of the first light and an optical path of the second light partly overlap with each other. In order to facilitate understanding, the optical path of the first light and the optical path of the second light are individually described with reference to different drawings.

Figure 3:
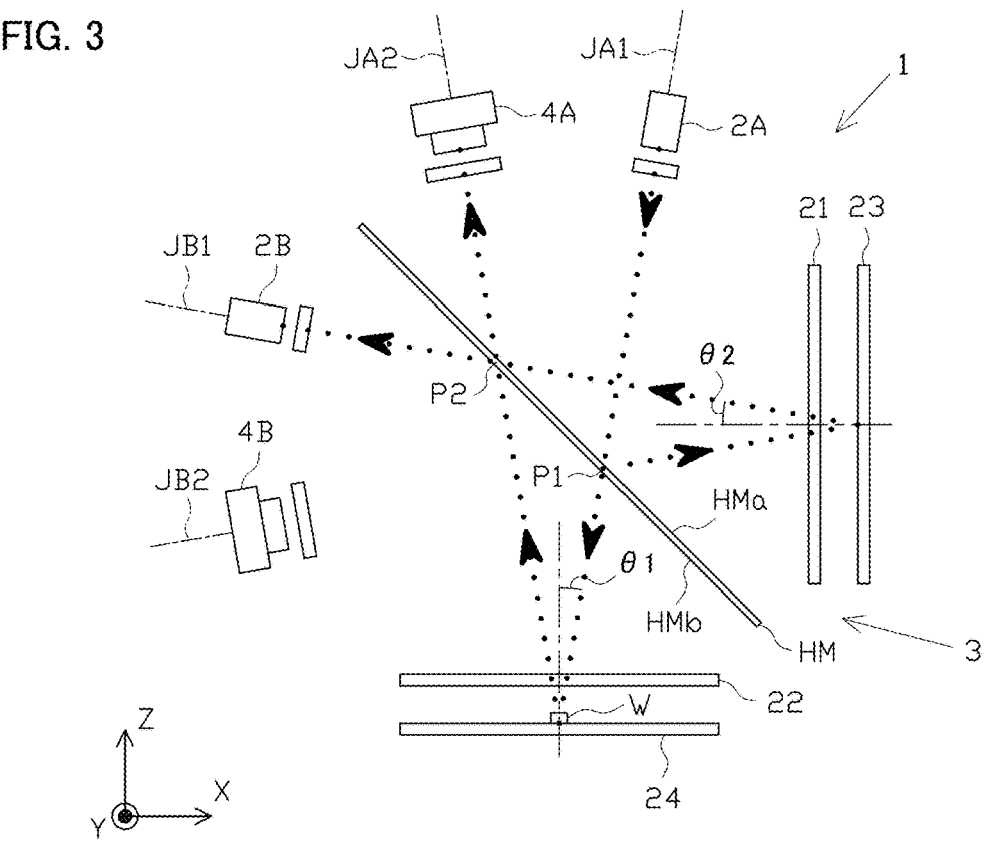
FIG. 3 is an optical path diagram illustrating an optical path of first light.

An optical path of the first light is described first with reference to FIG. 3. As shown in FIG. 3, the first light having the wavelength $\lambda 1$ (the linearly polarized light having the polarizing direction inclined at 45 degrees to the X-axis direction and the Y-axis direction) is emitted from the first projection optical system 2A (the first light emitter 11A) toward the interference optical system 3. The traveling direction of light (vector) is inclined at the angle $\theta 1$ described above to the Z-axis direction.

The first light emitted from the first projection optical system 2A enters a first position P1 of the half mirror HM. Accordingly, this "first position P1 of the half mirror HM" configures the "first input portion" according to the embodiment.

Part (half) of the first light entering the first position P1 of the half mirror HM is reflected by the first face HMa and is emitted toward the polarizing plate 21, while the remaining part (remaining half) is transmitted through the half mirror HM and is emitted from the second face HMb toward the polarizing plate 22.

The first light reflected by the first face HMa of the half mirror HM enters the polarizing plate 21, and only a P-polarized light component of this first light is transmitted through the polarizing plate 21. The P-polarized light component of the first light transmitted through the polarizing plate 21 is radiated to and reflected by the reference plane 23 as reference light. An angle of incidence and an angle of reflection of the reference light (P-polarized light) with regard to the first light to the reference plane 23 are equal to the angle θ1 described above.

The reference light (P-polarized light) with regard to the first light reflected by the reference plane 23 is then again transmitted through the polarizing plate 21 and enters a second position P2 of the half mirror HM. Part (half) of the reference light with regard to the first light entering the second position P2 of the half mirror HM is reflected by the first face HMa and is emitted toward the first imaging system 4A, while the remaining part (remaining half) is transmitted through the half mirror HM and is emitted from the second face HMb toward the second projection optical system 2B.

The first light that is emitted from the first projection optical system 2A, that enters the first position P1 of the half mirror HM and that is transmitted through the half mirror HM, on the other hand, enters the polarizing plate 22, and only an S-polarized light component of this first light is transmitted through the polarizing plate 22. The S-polarized light component of the first light transmitted through the polarizing plate 22 is radiated to and reflected by the work W as measurement light. An angle of incidence and an angle of reflection of the measurement light with regard to the first light to the mounting portion 24 (the work W) are equal to the angle θ1 described above.

The measurement light (S-polarized light) with regard to the first light reflected by the work W is then again transmitted through the polarizing plate 22 and enters the second position P2 of the half mirror HM. Part (half) of the measurement light with regard to the first light entering the second position P2 of the half mirror HM is transmitted through the half mirror HM and is emitted from the first face HMa toward the first imaging system 4A, while the remaining part (remaining half) is reflected by the second face HMb and is emitted toward the second projection optical system 2B.

Accordingly, at the second position P2 of the half mirror HM, the reference light (P-polarized light) with regard to the first light reflected by the first face HMa is combined with the measurement light (S-polarized light) with regard to the first light transmitted to the first face HMa, whereas the reference light (P-polarized light) with regard to the first light transmitted to the second face HMb is combined with the measurement light (S-polarized light) with regard to the first light reflected by the second face HMb.

As a result, combined lights generated by combining the reference light (P-polarized light) with the measurement light (S-polarized light) with regard to the first light are emitted from the second position P2 of the half mirror HM toward the first imaging system 4A and toward the second projection optical system 2B, as output lights from the interference optical system 3. Accordingly, this "second position P2 of the half mirror HM" configures the "first output portion" according to the embodiment.

The combined light (the reference light and the measurement light) with regard to the first light entering the second projection optical system 2B is blocked by the second light isolator 12B and becomes unused light.

When the combined light (the reference light and the measurement light) with regard to the first light enters the first imaging system 4A, on the other hand, the quarter-wave plate 31A converts the measurement light component (the S-polarized light component) thereof into a counterclockwise circularly polarized light, while converting the reference light component (the P-polarized light component) thereof into a clockwise circularly polarized light. The counterclockwise circularly polarized light and the clockwise circularly polarized light have different rotating directions and thus do not interfere with each other.

The combined light with regard to the first light subsequently enters the first camera 33A (the polarization image sensor 70A) and passes through the polarizer array 72, so that the reference light component and the measurement light component of the combined light interfere with each other in the phases corresponding to the angles of the transmission axes of the respective polarizers 75a, 75b, 75c and 75d. Images of the interfering lights with regard to the first light are then taken by the first camera 33A (the light-receiving element array 71).

More concretely, the light-receiving element 74 corresponding to the first polarizer 75a receives the interfering light with regard to the first light having a phase difference of "0 degree" between the reference light component and the measurement light component given by the first polarizer 75a.

Similarly, the light-receiving element 74 corresponding to the second polarizer 75b receives the interfering light with regard to the first light having a phase difference of "90 degrees" between the reference light component and the measurement light component given by the second polarizer 75b. The light-receiving element 74 corresponding to the third polarizer 75c receives the interfering light with regard to the first light having a phase difference of "180 degrees" between the reference light component and the measurement light component given by the third polarizer 75c. The light-receiving element 74 corresponding to the fourth polarizer 75d receives the interfering light with regard to the first light having a phase difference of "270 degrees" between the reference light component and the measurement light component given by the fourth polarizer 75d.

Figure 4:
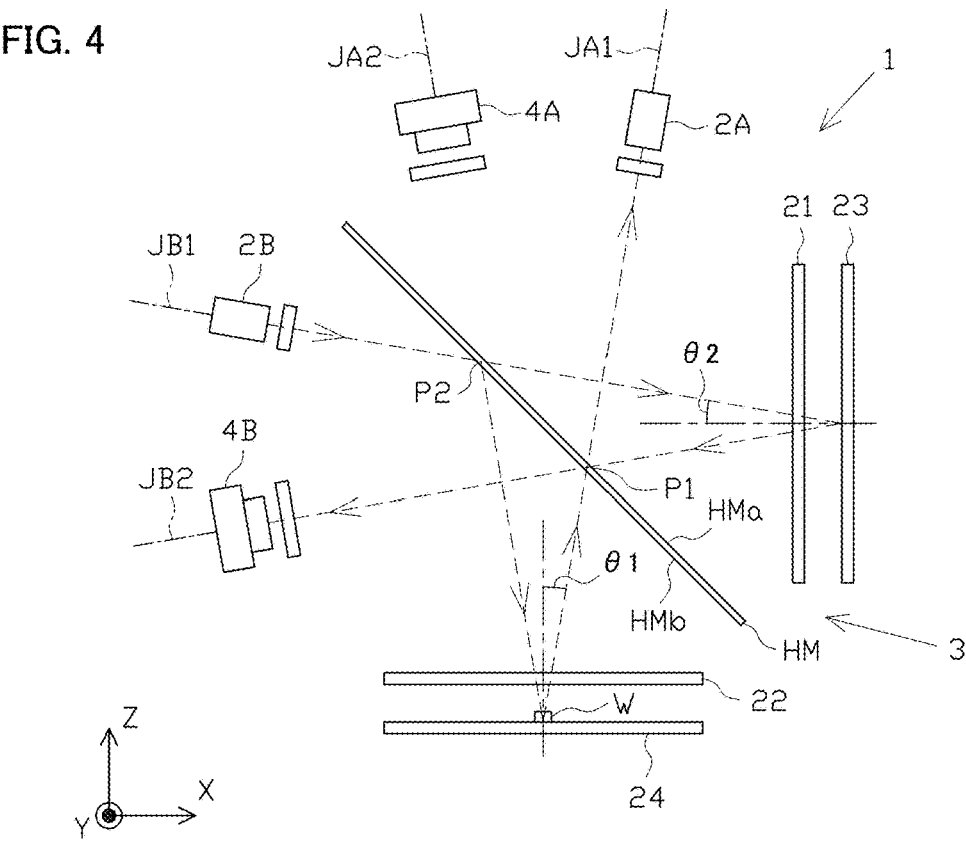
FIG. 4 is an optical path diagram illustrating an optical path of second light.

An optical path of the second light is described next with reference to FIG. 4. As shown in FIG. 4, the second light having the wavelength λ2 (the linearly polarized light having the polarizing direction inclined at 45 degrees to the Y-axis direction and the Z-axis direction) is emitted from the second projection optical system 2B (the second light emitter 11B) toward the interference optical system 3. The traveling direction of light (vector) is inclined at the angle θ2 (=θ1) to the X-axis direction.

The second light emitted from the second projection optical system 2B enters the second position P2 of the half mirror HM. Accordingly, this "second position P2 of the half mirror HM" configures the "second input portion" according to the embodiment.

Part (half) of the second light entering the second position P2 of the half mirror HM is transmitted through the half mirror HM and is emitted toward the polarizing plate 21, while the remaining part (remaining half) is reflected by the second face HMb and is emitted toward the polarizing plate 22.

The second light transmitted through the second position P2 of the half mirror HM enters the polarizing plate 21, and only a P-polarized light component of this second light is transmitted through the polarizing plate 21. The P-polarized light component of the second light transmitted through the polarizing plate 21 is radiated to and reflected by the reference plane 23 as reference light. An angle of incidence and an angle of reflection of the reference light (P-polarized light) with regard to the second light to the reference plane 23 are equal to the angle θ2 described above.

The reference light (P-polarized light) with regard to the second light reflected by the reference plane 23 is then again transmitted through the polarizing plate 21 and enters the first position P1 of the half mirror HM. Part (half) of the reference light with regard to the second light entering the first position P1 of the half mirror HM is transmitted through the half mirror HM and is emitted from the second face HMb toward the second imaging system 4B, while the remaining part (remaining half) is reflected by the first face HMa and is emitted toward the first projection optical system 2A.

The second light that is emitted from the second projection optical system 2B, that enters the second position P2 of the half mirror HM and that is reflected by the second face HMb, on the other hand, enters the polarizing plate 22, and only an S-polarized light component of this second light is transmitted through the polarizing plate 22. The S-polarized light component of the second light transmitted through the polarizing plate 22 is radiated to and reflected by the work W as measurement light. An angle of incidence and an angle of reflection of the measurement light with regard to the second light to the mounting portion 24 (the work W) are equal to the angle θ2 described above.

The measurement light (S-polarized light) with regard to the second light reflected by the work W is then again transmitted through the polarizing plate 22 and enters the first position P1 of the half mirror HM. Part (half) of the measurement light with regard to the second light entering the first position P1 of the half mirror HM is reflected by the second face HMb and is emitted toward the second imaging system 4B, while the remaining part (remaining half) is transmitted through the half mirror HM and is emitted from the first face HMa toward the first projection optical system 2A.

Accordingly, at the first position P1 of the half mirror HM, the reference light (P-polarized light) with regard to the second light reflected by the first face HMa is combined with the measurement light (S-polarized light) with regard to the second light transmitted to the first face HMa, whereas the reference light (P-polarized light) with regard to the second light transmitted to the second face HMb is combined with the measurement light (S-polarized light) with regard to the second light reflected by the second face HMb.

As a result, combined lights generated by combining the reference light (P-polarized light) with the measurement light (S-polarized light) with regard to the second light are emitted from the first position P1 of the half mirror HM toward the second imaging system 4B and toward the first projection optical system 2A, as output lights from the interference optical system 3. Accordingly, this "first position P1 of the half mirror HM" configures the "second output portion" according to the embodiment.

The combined light (the reference light and the measurement light) with regard to the second light entering the first projection optical system 2A is blocked by the first light isolator 12A and becomes unused light.

When the combined light (the reference light and the measurement light) with regard to the second light enters the second imaging system 4B, on the other hand, the quarter-wave plate 31B converts the measurement light component (the S-polarized light component) thereof into a counterclockwise circularly polarized light, while converting the reference light component (the P-polarized light component) thereof into a clockwise circularly polarized light. The counterclockwise circularly polarized light and the clockwise circularly polarized light have different rotating directions and thus do not interfere with each other.

The combined light with regard to the second light subsequently enters the second camera 33B (the polarization image sensor 70B) and passes through the polarizer array 72, so that the reference light component and the measurement light component of the combined light interfere with each other in the phases corresponding to the angles of the transmission axes of the respective polarizers 75a, 75b, 75c and 75d. Images of the interfering lights with regard to the second light are then taken by the second camera 33B (the light-receiving element array 71).

More concretely, the light-receiving element 74 corresponding to the first polarizer 75a receives the interfering light with regard to the second light having a phase difference of "0 degree" between the reference light component and the measurement light component given by the first polarizer 75a.

Similarly, the light-receiving element 74 corresponding to the second polarizer 75b receives the interfering light with regard to the second light having a phase difference of "90 degrees" between the reference light component and the measurement light component given by the second polarizer 75b. The light-receiving element 74 corresponding to the third polarizer 75c receives the interfering light with regard to the second light having a phase difference of "180 degrees" between the reference light component and the measurement light component given by the third polarizer 75c. The light-receiving element 74 corresponding to the fourth polarizer 75d receives the interfering light with regard to the second light having a phase difference of "270 degrees" between the reference light component and the measurement light component given by the fourth polarizer 75d.

The following describes a procedure of a shape measurement process performed by the control device 5 in detail. After a work W is placed on the mounting portion 24, the first light is radiated from the first projection optical system 2A to the interference optical system 3 (the first position P1 of the half mirror HM), and simultaneously the second light is radiated from the second projection optical system 2B to the interference optical system 3 (the second position P2 of the half mirror HM).

As a result, the combined light (the reference light and the measurement light) with regard to the first light is emitted from the interference optical system 3 (the second position P2 of the half mirror HM) to the first imaging system 4A, and simultaneously the combined light (the reference light and the measurement light) with regard to the second light is emitted from the interference optical system 3 (the first position P1 of the half mirror HM) to the second imaging system 4B.

Subsequently, images of the combined light with regard to the first light are taken by the first imaging system 4A, and simultaneously images of the combined light with regard to the second light are taken by the second imaging system 4B. Luminance image data thus obtained are output from the respective cameras 33A and 33B to the control device 5. The control device 5 stores the input luminance image data into the image data storage device 54.

The luminance image data obtained by one imaging process (the luminance image data with regard to the first light and the luminance image data with regard to the second light) include four different types of luminance data required for three-dimensional measurement (intensity data of four different interfering lights having different phases).

The control device 5 subsequently measures a surface shape of the work W by the phase shift method, based on the luminance image data with regard to the first light and the luminance image data with regard to the second light stored in the image data storage device 54. Accordingly, the control device 5 performs height measurement at respective measurement positions on the surface of the work W. The measurement results (height data) of the work W thus obtained are stored into the calculation result storage device 55 of the control device 5. The measurement procedure by the phase shift method using the two different types of lights having different wavelengths as described above is the publicly known technique (as described in, for example, JP No. 6271493B) and is not described in detail herein.

As described above in detail, in the configuration of this embodiment, there is no section where the traveling directions of the first light and the second light (vectors) from the projection optical systems 2A and 2B to the imaging systems 4A and 4B overlap with each other. Accordingly, the first light and the second light entering the interference optical system 3 do not interfere with each other but are separately emitted from the interference optical system 3 in the completely separated state.

As described above, the configuration of this embodiment enables the first light and the second light to be treated completely separately from each other by only appropriately setting the positions of incidence and the angles of incidence of the first light and the second light relative to the interference optical system 3. This significantly reduces optical members such as polarizing beam splitters and quarter-wave plates required for separation and conversion of the polarized light components (the P-polarized light and the S-polarized light) and simplifies the configuration. Especially, this provides an optical system with omission of a quarter-wave plate which causes polarized light components of two different types of lights having different wavelengths to pass through on an identical optical path in an identical direction.

As a result, this configuration eliminates the influence of a manufacturing error or the like caused by a predetermined optical member and enhances the measurement accuracy.

This configuration enables two different types of lights having close wavelengths to be used as the first light and the second light and further extends the measurement range in three-dimensional measurement. Furthermore, this configuration enables imaging of the output light with regard to the first light to be performed simultaneously with imaging of the output light with regard to the second light and thereby improves the measurement efficiency.

Additionally, the configuration of the embodiment uses the polarization image sensors 70A and 70B as the imaging elements of the cameras 33A and 33B. This configuration enables a plurality of different luminance data required for height measurement of the work W by the phase shift method to be simultaneously obtained by one single imaging operation using each of the cameras 33A and 33B. As a result, this achieves, for example, simplification of the configuration and reduction of the time required for obtaining data.

Second Embodiment

Figure 6:
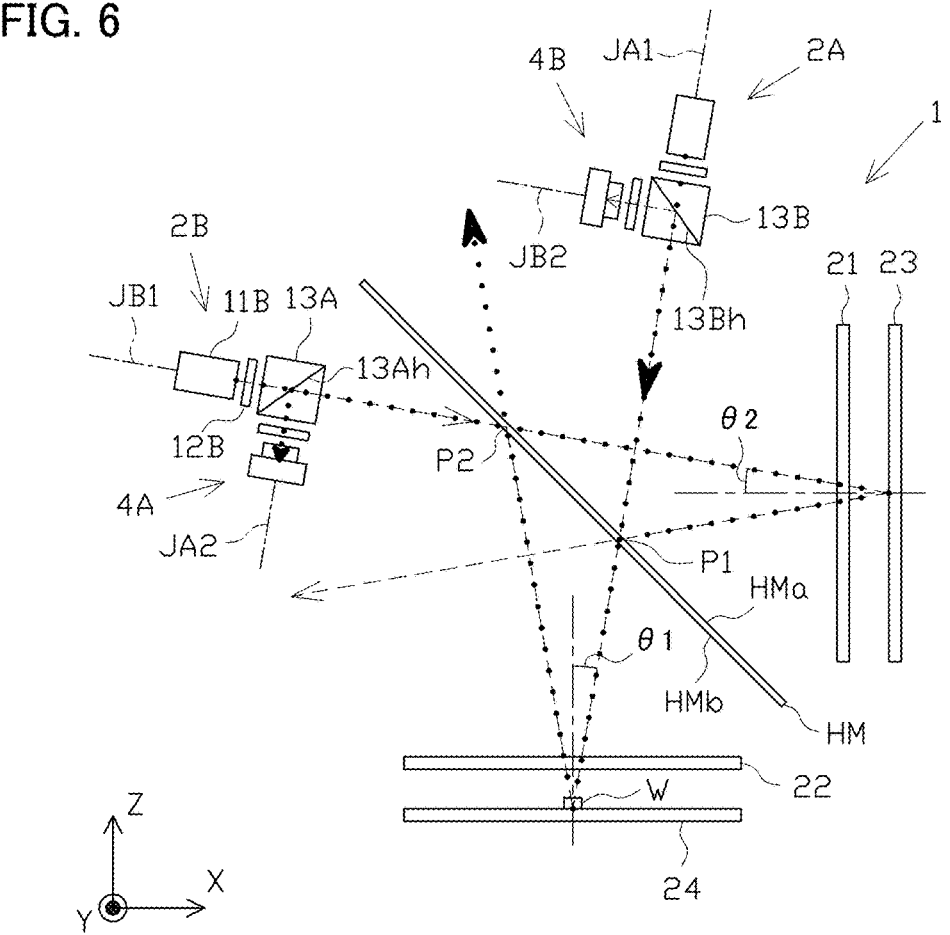
FIG. 6 is a schematic configuration diagram illustrating a three-dimensional measurement device according to a second embodiment.

The following describes a second embodiment with reference to FIG. 6. This embodiment differs from the first embodiment mainly by the arrangement and the configuration of the imaging systems 4A and 4B. Accordingly, the characteristic parts of this embodiment different from the first embodiment are described below in detail, whereas the like components are expressed by the like reference signs and are not described in detail.

The first imaging system 4A according to this embodiment is configured to take an image of the light emitted toward the second projection optical system 2B out of the combined light with regard to the first light emitted in two directions from the second position P2 of the half mirror HM. Similarly, the second imaging system 4B according to this embodiment is configured to take an image of the light emitted toward the first projection optical system 2A out of the combined light with regard to the second light emitted in two directions from the first position P1 of the half mirror HM. These configurations are described below in detail.

According to this embodiment, a first beam splitter 13A is provided between the second projection optical system 2B and the half mirror HM and is arranged to overlap with the optical axis JB1 of the second light emitter 11B.

The first beam splitter 13A is a known cube-shaped optical member obtained by joining right-angle prisms (triangular prisms respectively having isosceles right triangular bottom faces: The same applies to the description hereafter) with each other to be integrated, and has a joint surface 13Ah coated with, for example, a metal film.

Like the half mirror HM, the beam splitter serves to split incident light including a polarization state thereof into transmitted light and reflected light at a predetermined ratio (1:1 according to the embodiment). The same applies to the description hereafter. The beam splitter accordingly splits the incident light into a P-polarized light component and an S-polarized light component of transmitted light and a P-polarized light component and an S-polarized light component of reflected light all at identical rates, with keeping the respective polarization states of the transmitted light and the reflected light identical with the polarization state of the incident light.

The first beam splitter 13A is arranged such that one of two adjacent faces across the joint surface 13Ah thereof is perpendicular to the optical axis JB1 of the second light emitter 11B and the other of the two adjacent faces is perpendicular to the optical axis JA2 of the first camera 33A. In other words, the joint surface 13Ah of the first beam splitter 13A is arranged to be inclined at an angle of 45 degrees to the optical axis JB1 and to the optical axis JA2.

This configuration enables part (half) of the combined light with regard to the first light emitted from the second face HMb at the second position P2 of the half mirror HM via the first beam splitter 13A to be transmitted to the second projection optical system 2B-side, while enabling the remaining part (remaining half) to be reflected to and enter the first imaging system 4A-side.

According to this embodiment, a second beam splitter 13B is provided between the first projection optical system 2A and the half mirror HM and is arranged to overlap with the optical axis JA1 of the first light emitter 11A.

Like the first beam splitter 13A, the second beam splitter 13B is a known cube-shaped optical member obtained by joining right-angle prisms with each other to be integrated, and has a joint surface 13Bh coated with, for example, a metal film.

The second beam splitter 13B is arranged such that one of two adjacent faces across the joint surface 13Bh thereof is perpendicular to the optical axis JA1 of the first light emitter 11A and the other of the two adjacent faces is perpendicular to the optical axis JB2 of the second camera 33B. In other words, the joint surface 13Bh of the second beam splitter 13B is arranged to be inclined at an angle of 45 degrees to the optical axis JA1 and to the optical axis JB2.

This configuration enables part (half) of the combined light with regard to the second light emitted from the first face HMa at the first position P1 of the half mirror HM via the second beam splitter 13B to be transmitted to the first projection optical system 2A-side, while enabling the remaining part (remaining half) to be reflected to and enter the second imaging system 4B-side.

The following describes an optical path of the first light according to the embodiment. The first light emitted from the first projection optical system 2A enters the second beam splitter 13B.

Part (half) of the first light entering the second beam splitter 13B is transmitted through the joint surface 13Bh and enters the first position P1 of the half mirror HM. The remaining part (remaining half) of the first light entering the second beam splitter 13B is, on the other hand, reflected by the joint surface 13Bh and becomes unused light.

The first light entering the first position P1 of the half mirror HM then follows an optical path similar to that of the first embodiment described above. Combined light generated by combining reference light (P-polarized light) with measurement light (S-polarized light) with regard to the first light is emitted from the second position P2 of the half mirror HM to the first beam splitter 13A.

Part (half) of the combined light (the reference light and the measurement light) with regard to the first light entering the first beam splitter 13A is transmitted through the joint surface 13Ah and enters the second projection optical system 2B, while the remaining part (remaining half) is reflected by the joint surface 13Ah and enters the first imaging system 4A.

The combined light (the reference light and the measurement light) with regard to the first light entering the second projection optical system 2B is blocked by the second light isolator 12B and becomes unused light. As for the combined light with regard to the first light entering the first imaging system 4A, on the other hand, the reference light component and the measurement light component thereof are respectively converted into circularly polarized lights, and images of the circularly polarized lights are taken as interfering lights.

The following describes an optical path of the second light according to the embodiment. The second light emitted from the second projection optical system 2B enters the first beam splitter 13A.

Part (half) of the second light entering the first beam splitter 13A is transmitted through the joint surface 13Ah and enters the second position P2 of the half mirror HM. The remaining part (remaining half) of the second light entering the first beam splitter 13A is, on the other hand, reflected by the joint surface 13Ah and becomes unused light.

The second light entering the second position P2 of the half mirror HM then follows an optical path similar to that of the first embodiment described above. Combined light generated by combining reference light (P-polarized light) with measurement light (S-polarized light) with regard to the second light is emitted from the first position P1 of the half mirror HM to the second beam splitter 13B.

Part (half) of the combined light (the reference light and the measurement light) with regard to the second light entering the second beam splitter 13B is transmitted through the joint surface 13Bh and enters the first projection optical system 2A, while the remaining part (remaining half) is reflected by the joint surface 13Bh and enters the second imaging system 4B.

The combined light (the reference light and the measurement light) with regard to the second light entering the first projection optical system 2A is blocked by the first light isolator 12A and becomes unused light. As for the combined light with regard to the second light entering the second imaging system 4B, on the other hand, the reference light component and the measurement light component thereof are respectively converted into circularly polarized lights, and images of the circularly polarized lights are taken as interfering lights.

As described above in detail, the configuration of this embodiment has similar functions and advantageous effects to those of the first embodiment described above. Additionally, the configuration of this embodiment allows for intensive layout of various devices and equipment.

The configuration of this embodiment, however, uses the beam splitters 13A and 13B in addition to the half mirror HM and thereby reduces the amounts of lights entering the imaging systems 4A and 4B by half From this point of view, the configuration of the first embodiment is appropriate.

Third Embodiment

Figure 7:
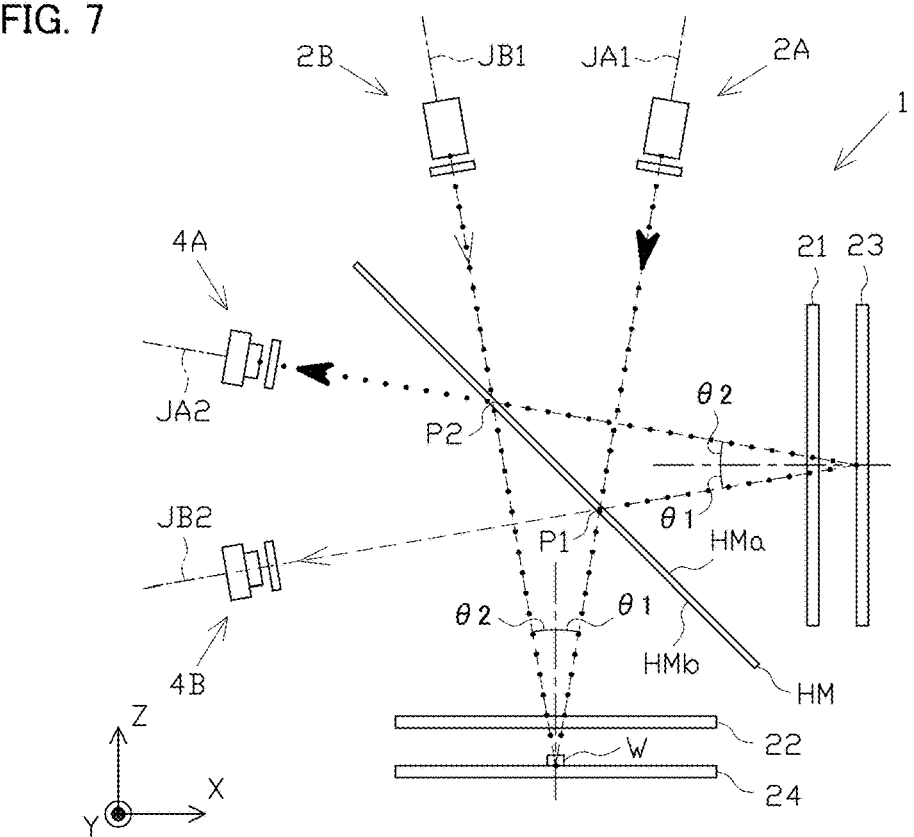
FIG. 7 is a schematic configuration diagram illustrating a three-dimensional measurement device according to a third embodiment.

The following describes a third embodiment with reference to FIG. 7. This embodiment differs from the first embodiment mainly by the arrangements and the configurations of the projection optical systems 2A and 2B and the imaging systems 4A and 4B. Accordingly, the characteristic parts of this embodiment different from the first embodiment are described below in detail, whereas the like components are expressed by the like reference signs and are not described in detail.

This embodiment is configured such that both the first light emitted from the first projection optical system 2A (the first light emitter 11A) and the second light emitted from the second projection optical system 2B (the second light emitter 11B) enter the first face HMa of the half mirror HM.

More specifically, the optical axis (direction of emission of the first light) JA1 of the first light emitter 11A is inclined rightward at an angle $\theta 1$ to the Z-axis direction, and the optical axis (direction of emission of the second light) JB1 of the second light emitter 11B is inclined leftward at an angle $\theta 2$ to the Z-axis direction. In the configuration of this embodiment, the angle $\theta 1$ and the angle $\theta 2$ are set to identical angles, and the first projection optical system 2A and the second projection optical system 2B are arranged symmetrically with respect to the Z-axis direction.

Furthermore, according to the embodiment, the first imaging system 4A is arranged such that the combined light with regard to the first light emitted from the second face HMb of the half mirror HM enters the first imaging system 4A. The second imaging system 4B is arranged such that the combined light with regard to the second light emitted from the second face MTh of the half mirror HM enters the second imaging system 4B.

More specifically, the optical axis (direction of incidence of the combined light with regard to the first light) JA2 of the first camera 33A is inclined upward at the angle $\theta 1$ to the X-axis direction, and the optical axis (direction of incidence of the combined light with regard to the second light) JB2 of the second camera 33B is inclined downward at the angle $\theta 2$ to the X-axis direction. In the configuration of the embodiment, the first imaging system 4A and the second imaging system 4B are thus arranged symmetrically with respect to the X-axis direction.

The following describes an optical path of the first light according to the embodiment. The first light emitted from the first projection optical system 2A enters the first position P1 of the half mirror HM. The first light then follows an optical path similar to that of the first embodiment described above. Combined light generated by combining reference light (P-polarized light) with measurement light (S-polarized light) with regard to the first light is emitted from the second position P2 of the half mirror HM toward the second projection optical system 2B and toward the first imaging system 4A.

The combined light (the reference light and the measurement light) with regard to the first light entering the second projection optical system 2B is blocked by the second light isolator 12B and becomes unused light. As for the combined light with regard to the first light entering the first imaging system 4A, on the other hand, the reference light component and the measurement light component thereof are respectively converted into circularly polarized lights, and images of the circularly polarized lights are taken as interfering lights.

The following describes an optical path of the second light according to the embodiment. The second light having the wavelength λ2 (the linearly polarized light having the polarizing direction inclined at 45 degrees to the X-axis direction and the Y-axis direction) is emitted from the second projection optical system 2B (the second light emitter 11B) toward the interference optical system 3.

The second light emitted from the second projection optical system 2B enters the second position P2 of the half mirror HM. Accordingly, this "second position P2 of the half mirror HM" configures the "second input portion" according to the embodiment.

Part (half) of the second light entering the second position P2 of the half mirror HM is reflected by the first face HMa and is emitted toward the polarizing plate 21, while the remaining part (remaining half) is transmitted through the half mirror HM and is emitted from the second face HMb toward the polarizing plate 22.

The second light reflected by the first face HMa of the half mirror HM enters the polarizing plate 21, and only a P-polarized light component of this second light is transmitted through the polarizing plate 21. The P-polarized light component of the second light transmitted through the polarizing plate 21 is radiated to and reflected by the reference plane 23 as reference light. An angle of incidence and an angle of reflection of the reference light (P-polarized light) with regard to the second light to the reference plane 23 are equal to the angle θ2 (=θ1) described above.

The reference light (P-polarized light) with regard to the second light reflected by the reference plane 23 is then again transmitted through the polarizing plate 21 and enters the first position P1 of the half mirror HM. Part (half) of the reference light with regard to the second light entering the first position P1 of the half mirror HM is reflected by the first face HM and is emitted toward the first projection optical system 2A, while the remaining part (remaining half) is transmitted through the half mirror HM and is emitted from the second face MTh toward the second imaging system 4B.

The second light that is emitted from the second projection optical system 2B, that enters the second position P2 of the half mirror HM and that is transmitted through the half mirror HM, on the other hand, enters the polarizing plate 22, and only an S-polarized light component of this second light is transmitted through the polarizing plate 22. The S-polarized light component of the second light transmitted through the polarizing plate 22 is radiated to and reflected by the work W as measurement light. An angle of incidence and an angle of reflection of the measurement light with regard to the second light to the mounting portion 24 (the work W) are equal to the angle θ2 (=θ1) described above.

The measurement light (S-polarized light) with regard to the second light reflected by the work W is then again transmitted through the polarizing plate 22 and enters the first position P1 of the half mirror HM. Part (half) of the measurement light with regard to the second light entering the first position P1 of the half mirror HM is transmitted through the half mirror HM and is emitted from the first face HMa toward the first projection optical system 2A, while the remaining part (remaining half) is reflected by the second face HMb and is emitted toward the second imaging system 4B.

Accordingly, at the first position P1 of the half mirror HM, the measurement light (S-polarized light) with regard to the second light reflected by the second face HMb is combined with the reference light (P-polarized light) with regard to the second light transmitted to the second face HMb, whereas the measurement light (S-polarized light) with regard to the second light transmitted to the first face HMa is combined with the reference light (P-polarized light) with regard to the second light reflected by the first face HMa.

As a result, combined lights generated by combining the reference light (P-polarized light) with the measurement light (S-polarized light) with regard to the second light are emitted from the first position P1 of the half mirror HM toward the second imaging system 4B and toward the first projection optical system 2A, as output lights from the interference optical system 3. Accordingly, this "first position P1 of the half mirror HM" configures the "second output portion" according to the embodiment.

The combined light (the reference light and the measurement light) with regard to the second light entering the first projection optical system 2A is blocked by the first light isolator 12A and becomes unused light.

As for the combined light with regard to the second light entering the second imaging system 4B, on the other hand, the reference light component and the measurement light component thereof are respectively converted into circularly polarized lights, and images of the circularly polarized lights are taken as interfering lights.

As described above in detail, the configuration of this embodiment has similar functions and advantageous effects to those of the first embodiment described above.

Fourth Embodiment

Figure 8:
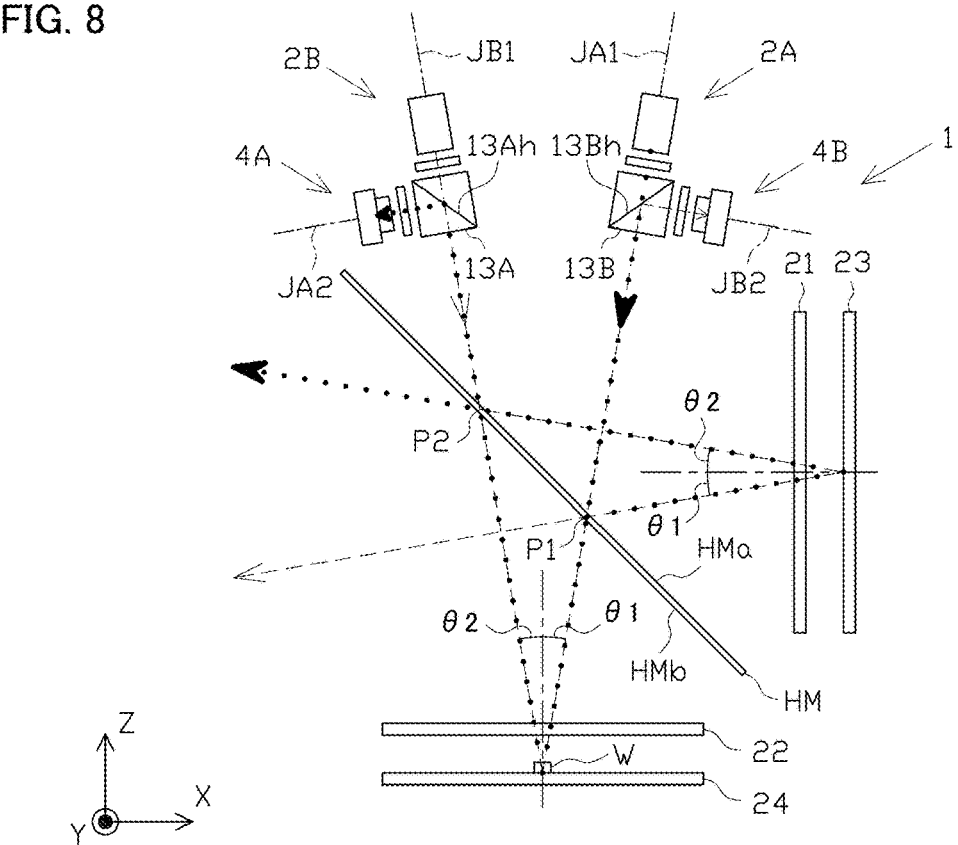
FIG. 8 is a schematic configuration diagram illustrating a three-dimensional measurement device according to a fourth embodiment.

The following describes a fourth embodiment with reference to FIG. 8. This embodiment has similar characteristics to those of the second embodiment and differs from the third embodiment mainly by the arrangement and the configuration of the imaging systems 4A and 4B. Accordingly, the characteristic parts of this embodiment different from the second embodiment and the third embodiment are described below in detail, whereas the like components are expressed by the like reference signs and are not described in detail.

The first imaging system 4A according to this embodiment is configured to take an image of the light emitted toward the second projection optical system 2B out of the combined light with regard to the first light emitted in two directions from the second position P2 of the half mirror HM. Similarly, the second imaging system 4B according to this embodiment is configured to take an image of the light emitted toward the first projection optical system 2A out of the combined light with regard to the second light emitted in two directions from the first position P1 of the half mirror HM. These configurations are described below in detail.

According to this embodiment, a first beam splitter 13A is provided between the second projection optical system 2B and the half mirror HM and is arranged to overlap with the optical axis JB1 of the second light emitter 11B.

The first beam splitter 13A is arranged such that one of two adjacent faces across the joint surface 13Ah thereof is perpendicular to the optical axis JB1 of the second light emitter 11B and the other of the two adjacent faces is perpendicular to the optical axis JA2 of the first camera 33A. In other words, the joint surface 13Ah of the first beam splitter 13A is arranged to be inclined at an angle of 45 degrees to the optical axis JB1 and to the optical axis JA2.

This configuration enables part (half) of the combined light with regard to the first light emitted from the first face HMa at the second position P2 of the half mirror HM via the first beam splitter 13A to be transmitted to the second projection optical system 2B-side, while enabling the remaining part (remaining half) to be reflected to and enter the first imaging system 4A-side.

According to this embodiment, a second beam splitter 13B is provided between the first projection optical system 2A and the half mirror HM and is arranged to overlap with the optical axis JA1 of the first light emitter 11A.

The second beam splitter 13B is arranged such that one of two adjacent faces across the joint surface 13Bh thereof is perpendicular to the optical axis JA1 of the first light emitter 11A and the other of the two adjacent faces is perpendicular to the optical axis JB2 of the second camera 33B. In other words, the joint surface 13Bh of the second beam splitter 13B is arranged to be inclined at an angle of 45 degrees to the optical axis JA1 and to the optical axis JB2.

This configuration enables part (half) of the combined light with regard to the second light emitted from the first face HMa at the first position P1 of the half mirror HM via the second beam splitter 13B to be transmitted to the first projection optical system 2A-side, while enabling the remaining part (remaining half) to be reflected to and enter the second imaging system 4B-side.

The following describes an optical path of the first light according to the embodiment. The first light emitted from the first projection optical system 2A enters the second beam splitter 13B.

Part (half) of the first light entering the second beam splitter 13B is transmitted through the joint surface 13Bh and enters the first position P1 of the half mirror HM. The remaining part (remaining half) of the first light entering the second beam splitter 13B is, on the other hand, reflected by the joint surface 13Bh and becomes unused light.

The first light entering the first position P1 of the half mirror HM then follows an optical path similar to that of the first embodiment described above. Combined light generated by combining reference light (P-polarized light) with measurement light (S-polarized light) with regard to the first light is emitted from the second position P2 of the half mirror HM to the first beam splitter 13A.

Part (half) of the combined light (the reference light and the measurement light) with regard to the first light entering the first beam splitter 13A is transmitted through the joint surface 13Ah and enters the second projection optical system 2B, while the remaining part (remaining half) is reflected by the joint surface 13Ah and enters the first imaging system 4A.

The combined light (the reference light and the measurement light) with regard to the first light entering the second projection optical system 2B is blocked by the second light isolator 12B and becomes unused light. As for the combined light with regard to the first light entering the first imaging system 4A, on the other hand, the reference light component and the measurement light component thereof are respectively converted into circularly polarized lights, and images of the circularly polarized lights are taken as interfering lights.

The following describes an optical path of the second light according to the embodiment. The second light emitted from the second projection optical system 2B enters the first beam splitter 13A.

Part (half) of the second light entering the first beam splitter 13A is transmitted through the joint surface 13Ah and enters the second position P2 of the half mirror HM. The remaining part (remaining half) of the second light entering the first beam splitter 13A is, on the other hand, reflected by the joint surface 13Ah and becomes unused light.

The second light entering the second position P2 of the half mirror HM then follows an optical path similar to that of the third embodiment described above. Combined light generated by combining reference light (P-polarized light) with measurement light (S-polarized light) with regard to the second light is emitted from the first position P1 of the half mirror HM to the second beam splitter 13B.

Part (half) of the combined light (the reference light and the measurement light) with regard to the second light entering the second beam splitter 13B is transmitted through the joint surface 13Bh and enters the first projection optical system 2A, while the remaining part (remaining half) is reflected by the joint surface 13Bh and enters the second imaging system 4B.

The combined light (the reference light and the measurement light) with regard to the second light entering the first projection optical system 2A is blocked by the first light isolator 12A and becomes unused light. As for the combined light with regard to the second light entering the second imaging system 4B, on the other hand, the reference light component and the measurement light component thereof are respectively converted into circularly polarized lights, and images of the circularly polarized lights are taken as interfering lights.

As described above in detail, the configuration of this embodiment has similar functions and advantageous effects to those of the first embodiment described above. Additionally, the configuration of this embodiment allows for intensive layout of various devices and equipment.

As in the second embodiment, however, the configuration of this embodiment uses the beam splitters 13A and 13B in addition to the half mirror HM and thereby reduces the amounts of lights entering the imaging systems 4A and 4B by half. From this point of view, the configuration of the third embodiment is appropriate.

Fifth Embodiment

Figure 9:
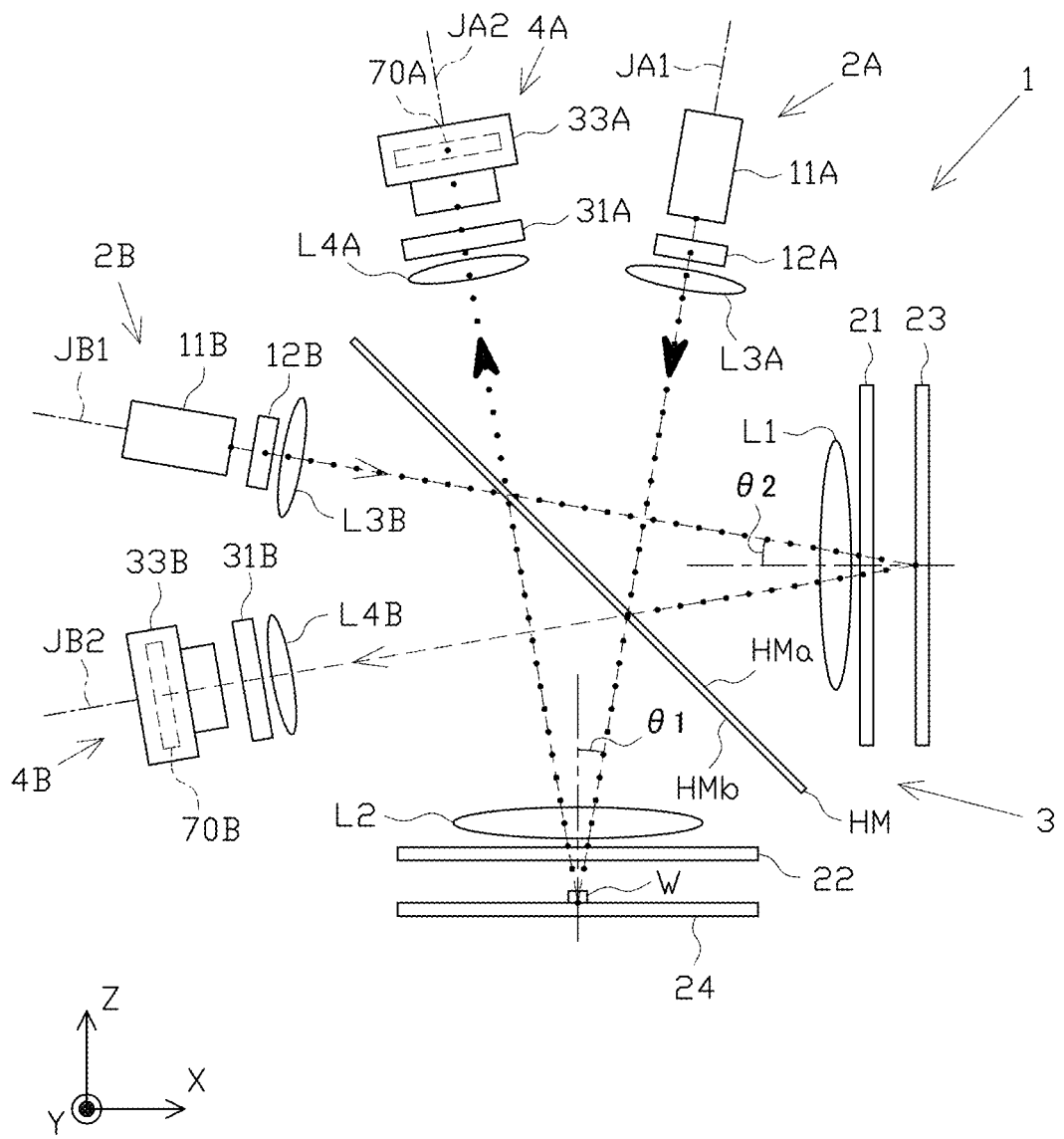
FIG. 9 is a schematic configuration diagram illustrating a three-dimensional measurement device according to a fifth embodiment.

The following describes a fifth embodiment with reference to FIG. 9. This embodiment differs from the first embodiment by the configuration of the embodiment provided with various lenses. Accordingly, the characteristic parts of this embodiment different from the first embodiment are described below in detail, whereas the like components are expressed by the like reference signs and are not described in detail.

In the interference optical system 3 according to the embodiment, an objective lens L1 is provided between the half mirror HM and the polarizing plate 21 and is arranged to be opposed to the polarizing plate 21 in the X-axis direction. An objective lens L2 is provided between the half mirror HM and the polarizing plate 22 and is arranged to be opposed to the polarizing plate 22 in the Z-axis direction.

The objective lens L1 is arranged such that a focal position on one side is positioned on the reference plane 23 and that focal positions on the other sides (first imaging system 4A-side and second imaging system 4B-side) respectively overlap with a focal position on the other side (interference optical system 3-side) of an imaging lens L4A described later and with a focal position on the other side (interference optical system 3-side) of an imaging lens L4B described later.

The objective lens L2 is arranged such that a focal position on one side is positioned on the mounting portion 24 and that focal positions on the other sides (first imaging system 4A-side and second imaging system 4B-side) respectively overlap with the focal position on the other side (the interference optical system 3-side) of the imaging lens L4A described later and with the focal position on the other side (the interference optical system 3-side) of the imaging lens L4B described later.

Each of the objective lenses L1 and L2 may be configured by a lens unit consisting of a plurality of lenses or may be configured by a single lens. Instead of the above configuration and arrangement, a modified configuration may be employed to place the objective lens L1 between the polarizing plate 21 and the reference plane 23. Similarly, a modified configuration may be employed to place the objective lens L2 between the polarizing plate 22 and the mounting portion 24 (the work W).

Furthermore, the first projection optical system 2A according to the embodiment is provided with a projection lens L3A that is placed between the first light isolator 12A and the half mirror HM and that is arranged to overlap with the optical axis JA1 of the first light emitter 11A. The projection lens L3A serves to direct and collect the first light emitted from the first light emitter 11A toward the objective lenses L1 and L2.

Similarly, the second projection optical system 2B according to the embodiment is provided with a projection lens L3B that is placed between the second light isolator 12B and the half mirror HM and that is arranged to overlap with the optical axis JB1 of the second light emitter 11B. The projection lens L3B serves to direct and collect the second light emitted from the second light emitter 11B toward the objective lenses L1 and L2.

The configuration and arrangement of the projection lenses L3A and L3B is not limited to the configuration described above. For example, the projection lens L3A may be placed between the first light emitter 11A and the first light isolator 12A. Similarly, the projection lens L3B may be placed between the second light emitter 11B and the second light isolator 12B.

Moreover, the first imaging system 4A according to the embodiment is provided with the imaging lens L4A that is placed between the quarter-wave plate 31A and the half mirror HM and that is arranged to overlap with the optical axis JA2 of the first camera 33A.

The imaging lens 4A is arranged such that a focal position on one side (first camera 33A-side) is positioned on the polarization image sensor 70A and that a focal position on the other side (interference optical system 3-side) is positioned to overlap with a focal position on the first imaging system 4A-side of the objective lens L1 for the reference light and with a focal position on the first imaging system 4A-side of the objective lens L2 for the measurement light.

The imaging lens L4A accordingly serves to cause the combined light with regard to the first light emitted from the half mirror HM to be imaged on the first camera 33A (on the polarization image sensor 70A).

Similarly, the second imaging system 4B according to the embodiment is provided with the imaging lens L4B that is placed between the quarter-wave plate 31B and the half mirror HM and that is arranged to overlap with the optical axis JB2 of the second camera 33B.

The imaging lens 4B is arranged such that a focal position on one side (second camera 33B-side) is positioned on the polarization image sensor 70B and that a focal position on the other side (interference optical system 3-side) is positioned to overlap with a focal position on the second imaging system 4B-side of the objective lens L1 for the reference light and with a focal position on the second imaging system 4B-side of the objective lens L2 for the measurement light.

The imaging lens L4B accordingly serves to cause the combined light with regard to the second light emitted from the half mirror HM to be imaged on the second camera 33B (on the polarization image sensor 70B).

Each of the imaging lenses L4A and L4B may be configured by a lens unit consisting of a plurality of lenses or may be configured by a single lens. Instead of the above configuration and arrangement, a modified configuration may be employed to place the imaging lens 4A between the quarter-wave plate 31A and the first camera 33A. Similarly, a modified configuration may be employed to place the imaging lens 4B between the quarter-wave plate 31B and the second camera 33B.

Figure 10A:
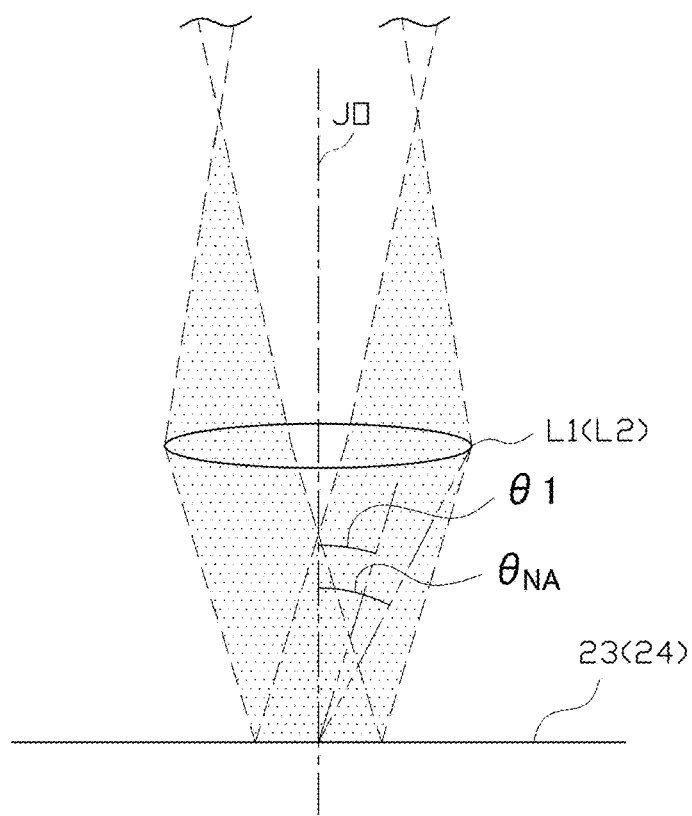
FIG. 10A and FIG. 10B are schematic diagrams illustrating angles of incidence of the first light to a reference plane and to a mounting portion in a configuration provided with objective lenses.
Figure 10B:
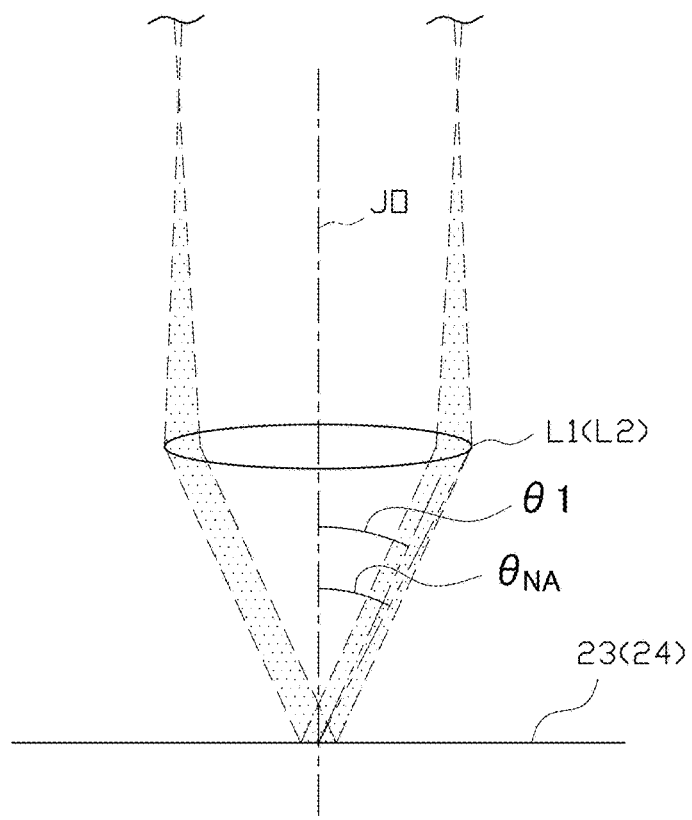

As shown in FIG. 10A and FIG. 10B, in the configuration provided with the objective lenses L1 and L2, an angle of incidence θ1 of the first light to the reference plane 23 or to the mounting portion 24 is required to satisfy Expression (2) given below. The same applies to an angle of incidence θ2 of the second light.

$$0 < \theta 1 < \theta_{NA} \quad (2)$$

where "$\theta_{NA}$" denotes a maximum angle of incidence (maximum angle to a center axis JO of the objective lens L1 or of the objective lens L2) of the first light that enters the reference plane 23 or the mounting portion 24 via the objective lens L1 or the objective lens L2 having a numerical aperture NA.

The numerical aperture NA of the objective lens L1 or of the objective lens L2 is expressed by Expression (3) given below:

$$NA = n \times \sin \theta_{NA} \quad (3)$$

where "n" denotes a refractive index of a medium between the reference plane 23 and the objective lens L1. In the air, n is approximately equal to 1.

As understood from the comparison between FIG. 10A and FIG. 10B, the smaller angle of incidence θ1 of the first light enables the wider range to be irradiated with uniform parallel light. As a result, this allows for uniform measurement of the wider range and further enhances the measurement accuracy. The same applies to the angle of incidence θ2 of the second light.

As described above in detail, the configuration of this embodiment has similar functions and advantageous effects to those of the first embodiment described above.

Furthermore, the configuration of this embodiment includes the objective lenses L1 and L2, the projection lenses L3A and L3B, and the imaging lenses L4A and L4B. This configuration enables image data focused on the work W to be obtained and also enables an enlarged image of the work W to be taken. As a result, this enhances the measurement accuracy.

In the configuration provided with the objective lenses L1 and L2 as in the case of this embodiment, light (measurement light) radiated to the work W is concentrated at one point (narrow area). It is thus likely to narrow a measurable measurement area.

The configuration of this embodiment provided with the projection lenses L3A and L3B, on the other hand, causes the light emitted from the light emitter 11A or 11B to be directed to and concentrated at the objective lens L1 or L2 and thereby enables the wider range of the work W to be irradiated with uniform parallel light. As a result, this allows for more uniform measurement of the wider range and further enhances the measurement accuracy and the measurement efficiency.

Sixth Embodiment

Figure 11:
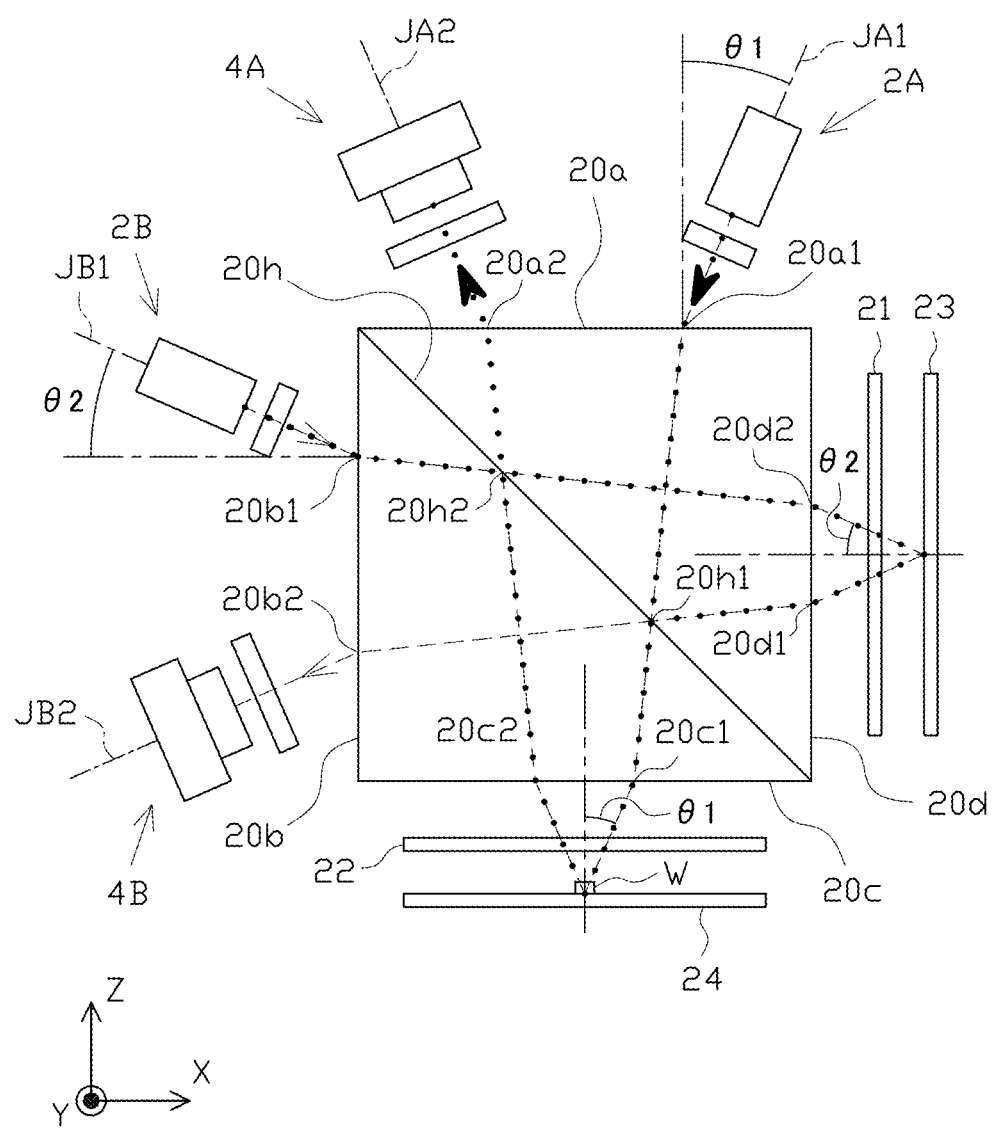
FIG. 11 is a schematic configuration diagram illustrating a three-dimensional measurement device according to a sixth embodiment.

The following describes a sixth embodiment with reference to FIG. 11. This embodiment differs from the first embodiment mainly by the configuration of the interference optical system 3. Accordingly, the characteristic parts of this embodiment different from the first embodiment are described below in detail, whereas the like components are expressed by the like reference signs and are not described in detail.

The interference optical system 3 according to the embodiment includes a beam splitter (BS) 20 as the optical unit, in place of the half mirror HM.

The beam splitter 20 is a known cube-shaped optical member obtained by joining right-angle prisms with each other to be integrated, and has a joint surface (boundary face) 20h coated with, for example, a metal film.

Like the half mirror HM, the beam splitter 20 serves to split incident light including a polarization state thereof into transmitted light and reflected light at a predetermined ratio (1:1 according to the embodiment). The beam splitter 20 accordingly splits the incident light into a P-polarized light component and an S-polarized light component of transmitted light and a P-polarized light component and an S-polarized light component of reflected light all at identical rates, with keeping the respective polarization states of the transmitted light and the reflected light identical with the polarization state of the incident light.

The beam splitter 20 is arranged such that one of two adjacent faces across the joint surface 20h thereof is perpendicular to the X-axis direction and the other of the two adjacent faces is perpendicular to the Z-axis direction. In other words, the joint surface 20h of the beam splitter 20 is arranged to be inclined at an angle of 45 degrees to the X-axis direction and to the Z-axis direction.

More specifically, a first face (upper side face in the Z-axis direction) 20a of the beam splitter 20, which the first light emitted from the first projection optical system 2A (the first light emitter 11A) enters, and a third face (lower side face in the Z-axis direction) 20c opposed to the first face 20a are arranged to be perpendicular to the Z-axis direction.

A second face (left side face in the X-axis direction) 20b of the beam splitter 20,] which is a face adjacent to the first face 20a across the joint surface 20h and which the second light emitted from the second projection optical system 2B (the second light emitter 11B) enters, and a fourth face (right side face in the X-axis direction) 20d opposed to the second face are, on the other hand, arranged to be perpendicular to the X-axis direction.

In the interference optical system 3 according to the embodiment, a polarizing plate 21 is arranged to be opposed to the fourth face 20d of the beam splitter 20 in the X-axis direction, and a reference plane 23 is arranged to be opposed to the polarizing plate 21 in the X-axis direction.

Accordingly, only a P-polarized light component of light emitted from the fourth face 20d of the beam splitter 20 is transmitted through the polarizing plate 21 and is radiated to the reference plane 23, as reference light. The reference light (P-polarized light) reflected by the reference plane 23 is again transmitted through the polarizing plate 21 and enters the fourth face 20d of the beam splitter 20.

A polarizing plate 22 is, on the other hand, arranged to be opposed to the third face 20c of the beam splitter 20 in the Z-axis direction, and a mounting portion 24 is arranged to be opposed to the polarizing plate 22 in the Z-axis direction.

Accordingly, only an S-polarized light component of light emitted from the third face 20c of the beam splitter 20 is transmitted through the polarizing plate 22 and is radiated to the work W that is a measurement object placed on the mounting portion 24, as measurement light. The measurement light (S-polarized light) reflected by the work W is again transmitted through the polarizing plate 22 and enters the third face 20c of the beam splitter 20.

The following describes an optical path of the first light. The first light is emitted from the first projection optical system 2A toward the interference optical system 3.

The first light emitted from the first projection optical system 2A enters a first position 20a1 on the first face 20a of the beam splitter 20. Accordingly, this "first position 20a1 on the first face 20a of the beam splitter 20" configures the "first input portion" according to the embodiment.

An optical axis (direction of emission of light) JA1 of the first light emitter 11A according to the embodiment is inclined rightward at an angle θ1 to the Z-axis direction. This angle θ1 is an angle of incidence of the first light to the first face 20a.

The first light entering the first face 20a of the beam splitter 20 is refracted at a predetermined angle of θ. At a first position 20h1 on the joint surface 20h, part (half) of the refracted first light is reflected by the joint surface 20h, is refracted at a predetermined angle of refraction from a first position 20d1 on the fourth face 20d, and is emitted toward the polarizing plate 21, while the remaining part (remaining half) is transmitted through the joint surface 20h, is refracted at a predetermined angle of refraction from a first position 20c1 on the third face 20c, and is emitted toward the polarizing plate 22.

The first light emitted from the first position 20d1 on the fourth face 20d of the beam splitter 20 enters the polarizing plate 21, and only a P-polarized light component of this first light is transmitted through the polarizing plate 21. The P-polarized light component of the first light transmitted through the polarizing plate 21 is radiated to and reflected by the reference plane 23 as the reference light. An angle of incidence and an angle of reflection of the reference light (P-polarized light) with regard to the first light to the reference plane 23 are equal to the angle θ1 described above.

The reference light (P-polarized light) with regard to the first light reflected by the reference plane 23 is then again transmitted through the polarizing plate 21 and enters a second position 20d2 on the fourth face 20d of the beam splitter 20.

The reference light with regard to the first light entering the second position 20d2 on the fourth face 20d of the beam splitter 20 is refracted at a predetermined angle of refraction. At a second position 20h2 on the joint surface 20h, part (half) of the refracted reference light is reflected by the joint surface 20h, is refracted at a predetermined angle of refraction from a second position 20a2 on the first face 20a of the beam splitter 20, and is emitted toward the first imaging system 4A, while the remaining part (remaining half) is transmitted through the joint surface 20h, is refracted at a predetermined angle of refraction from the first position 20$b$1 on the second face 20$b$ of the beam splitter 20, and is emitted toward the second projection optical system 2B.

The first light emitted from the first position 20$c$1 on the third face 20$c$ of the beam splitter 20, on the other hand, enters the polarizing plate 22, and only an S-polarized light component of this first light is transmitted through the polarizing plate 22. The S-polarized light component of the first light transmitted through the polarizing plate 22 is radiated to and reflected by the work W as measurement light. An angle of incidence and an angle of reflection of the measurement light with regard to the first light to the mounting portion 24 (the work W) are equal to the angle $\theta 1$ described above.

The measurement light (S-polarized light) with regard to the first light reflected by the work W is then again transmitted through the polarizing plate 22 and enters a second position 20$c$2 on the third face 20$c$ of the beam splitter 20.

The measurement light with regard to the first light entering the second position 20$c$2 on the third face 20$c$ of the beam splitter 20 is refracted at a predetermined angle of refraction. At the second position 20$h$2 on the joint surface 20$h$, part (half) of the refracted measurement light is reflected by the joint surface 20$h$, is refracted at a predetermined angle of refraction from the first position 20$b$1 on the second face 20$b$ of the beam splitter 20, and is emitted toward the second projection optical system 2B, while the remaining part (remaining half) is transmitted through the joint surface 20$h$, is refracted at a predetermined angle of refraction from the second position 20$a$2 on the first face 20$a$ of the beam splitter 20, and is emitted toward the first imaging system 4A.

Accordingly, at the second position 20$h$2 on the joint surface 20$h$, the reference light (P-polarized light) with regard to the first light reflected by the joint surface 20$h$ is combined with the measurement light (S-polarized light) with regard to the first light transmitted through the joint surface 20$h$, whereas the reference light (P-polarized light) with regard to the first light transmitted through the joint surface 20$h$ is combined with the measurement light (S-polarized light) with regard to the first light reflected by the joint surface 20$h$.

As a result, combined lights generated by combining the reference light (P-polarized light) with the measurement light (S-polarized light) with regard to the first light are emitted from the second position 20$a$2 on the first face 20$a$ of the beam splitter 20 toward the first imaging system 4A and emitted from the first position 20$b$1 on the second face 20$b$ of the beam splitter 20 toward the second projection optical system 2B, as output lights from the interference optical system 3. Accordingly, this "second position 20$a$2 on the first face 20$a$ of the beam splitter 20" configures the "first output portion" according to the embodiment.

The combined light (the reference light and the measurement light) with regard to the first light entering the second projection optical system 2B is blocked by the second light isolator 12B and becomes unused light. As for the combined light with regard to the first light entering the first imaging system 4A, on the other hand, the reference light component and the measurement light component thereof are respectively converted into circularly polarized lights, and images of the circularly polarized lights are taken as interfering lights.

The following describes an optical path of the second light. The second light is emitted from the second projection optical system 2B toward the interference optical system 3.

The second light emitted from the second projection optical system 2B enters the first position 20$b$1 on the second face 20$b$ of the beam splitter 20. Accordingly, this "first position 20$b$1 on the second face 20$b$ of the beam splitter 20" configures the "second input portion" according to the embodiment.

An optical axis (direction of emission of light) JB1 of the second light emitter 11B according to the embodiment is inclined upward at an angle $\theta 2$ to the X-axis direction. This angle $\theta 2$ is an angle of incidence of the second light to the second face 20$b$.

The second light entering the second face 20$b$ of the beam splitter 20 is refracted at a predetermined angle of refraction. At the second position 20$h$2 on the joint surface 20$h$, part (half) of the refracted second light is reflected by the joint surface 20$h$, is refracted at a predetermined angle of refraction from the second position 20$c$2 on the third face 20$c$, and is emitted toward the polarizing plate 22, while the remaining part (remaining half) is transmitted through the joint surface 20$h$, is refracted at a predetermined angle of refraction from the second position 20$d$2 on the fourth face 20$d$, and is emitted toward the polarizing plate 21.

The second light emitted from the second position 20$d$2 on the fourth face 20$d$ of the beam splitter 20 enters the polarizing plate 21, and only a P-polarized light component of this second light is transmitted through the polarizing plate 21. The P-polarized light component of the second light transmitted through the polarizing plate 21 is radiated to and reflected by the reference plane 23 as the reference light. An angle of incidence and an angle of reflection of the reference light (P-polarized light) with regard to the second light to the reference plane 23 are equal to the angle $\theta 2$ (=$\theta 1$) described above.

The reference light (P-polarized light) with regard to the second light reflected by the reference plane 23 is then again transmitted through the polarizing plate 21 and enters the first position 20$d$1 on the fourth face 20$d$ of the beam splitter 20.

The reference light with regard to the second light entering the first position 20$d$1 on the fourth face 20$d$ of the beam splitter 20 is refracted at a predetermined angle of refraction. At the first position 20$h$1 on the joint surface 20$h$, part (half) of the refracted reference light is reflected by the joint surface 20$h$, is refracted at a predetermined angle of refraction from the first position 20$a$1 on the first face 20$a$ of the beam splitter 20, and is emitted toward the first projection optical system 2A, while the remaining part (remaining half) is transmitted through the joint surface 20$h$, is refracted at a predetermined angle of refraction from the second position 20$b$2 on the second face 20$b$ of the beam splitter 20, and is emitted toward the second imaging system 4B.

The second light emitted from the second position 20$c$2 on the third face 20$c$ of the beam splitter 20, on the other hand, enters the polarizing plate 22, and only an S-polarized light component of this second light is transmitted through the polarizing plate 22. The S-polarized light component of the second light transmitted through the polarizing plate 22 is radiated to and reflected by the work W as measurement light. An angle of incidence and an angle of reflection of the measurement light with regard to the second light to the mounting portion 24 (the work W) are equal to the angle $\theta 2$ (=$\theta 1$) described above.

The measurement light (S-polarized light) with regard to the second light reflected by the work W is then again transmitted through the polarizing plate 22 and enters the first position 20$c$1 on the third face 20$c$ of the beam splitter 20.

The measurement light with regard to the second light entering the first position 20$c$1 on the third face 20$c$ of the beam splitter 20 is refracted at a predetermined angle of refraction. At the first position 20h1 on the joint surface 20h, part (half) of the refracted measurement light is reflected by the joint surface 20h, is refracted at a predetermined angle of refraction from the second position 20b2 on the second face 20b of the beam splitter 20, and is emitted toward the second imaging system 4B, while the remaining part (remaining half) is transmitted through the joint surface 20h, is refracted at a predetermined angle of refraction from the first position 20a1 on the first face 20a of the beam splitter 20, and is emitted toward the first projection optical system 2A.

Accordingly, at the first position 20h1 on the joint surface 20h, the reference light (P-polarized light) with regard to the second light reflected by the joint surface 20h is combined with the measurement light (S-polarized light) with regard to the second light transmitted through the joint surface 20h, whereas the reference light (P-polarized light) with regard to the second light transmitted through the joint surface 20h is combined with the measurement light (S-polarized light) with regard to the second light reflected by the joint surface 20h.

As a result, combined lights generated by combining the reference light (P-polarized light) with the measurement light (S-polarized light) with regard to the second light are emitted from the first position 20a1 on the first face 20a of the beam splitter 20 toward the first projection optical system 2A and emitted from the second position 20b2 on the second face 20b of the beam splitter 20 toward the second imaging system 4B, as output lights from the interference optical system 3. Accordingly, this "second position 20b2 on the second face 20b of the beam splitter 20" configures the "second output portion" according to the embodiment.

The combined light (the reference light and the measurement light) with regard to the second light entering the first projection optical system 2A is blocked by the first light isolator 12A and becomes unused light. As for the combined light with regard to the second light entering the second imaging system 4B, on the other hand, the reference light component and the measurement light component thereof are respectively converted into circularly polarized lights, and images of the circularly polarized lights are taken as interfering lights.

As described above in detail, the configuration of this embodiment has similar functions and advantageous effects to those of the first embodiment described above.

A modified configuration may include the objective lenses L1 and L2, the projection lenses L3A and L3B and the imaging lenses L4A and L4B like the fifth embodiment described above, in addition to the configuration of this embodiment.

In the case where the objective lenses L1 and L2 and the other lenses are placed relative to the beam splitter 20 that significantly refracts the light, however, there is a possibility that the light focused by the objective lenses L1 and L2 and the other lenses is not concentrated at one point. Accordingly, in the case where the objective lenses L1 and L2 and the other lenses are provided, the thin plate-like half mirror HM may be used, which substantially has no need to take into account the refraction, rather than the beam splitter 20.

Seventh Embodiment

Figure 12:
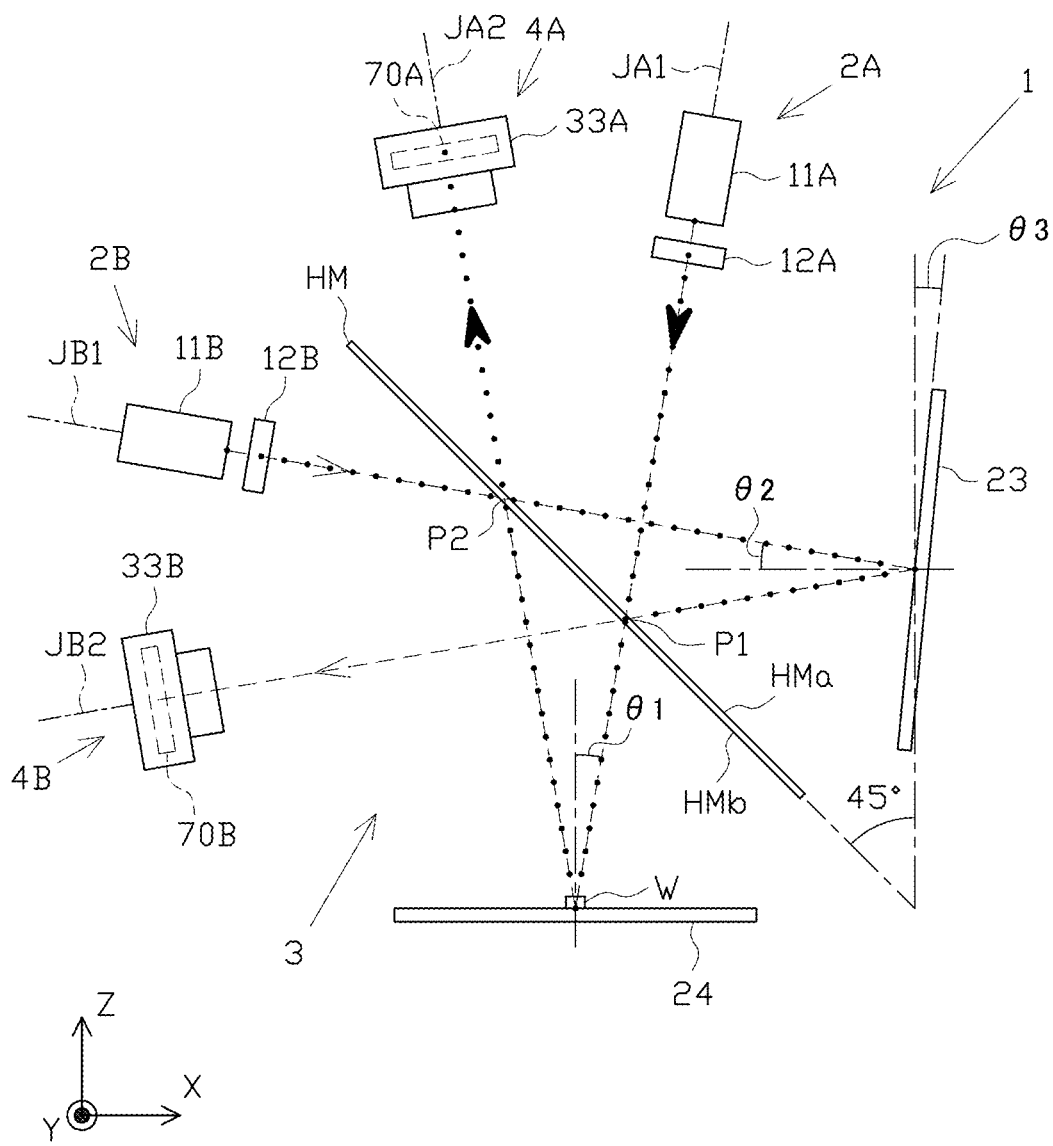
FIG. 12 is a schematic configuration diagram illustrating a three-dimensional measurement device according to a seventh embodiment.

The following describes a seventh embodiment with reference to FIG. 12. This embodiment differs from the first embodiment mainly by the configuration of the interference optical system 3 and the method of calculation. Accordingly, the characteristic parts of this embodiment different from the first embodiment are described below in detail, whereas the like components are expressed by the like reference signs and are not described in detail. In the embodiments described above, the angle between the reference plane 23 and the half mirror HM and the angle between the reference plane 23 and the joint surface 20h of the beam splitter 20 are equal to 45 degrees. In this embodiment, however, these angles are slightly inclined from 45 degrees. Actual optical paths are thus not strictly equal to those shown in FIG. 12. The angle of inclination is, however, small, so that deviations of positional relationships expressed by respective reference signs are negligible and do not substantially affect the description below.

The interference optical system 3 according to this embodiment differs from that of the first embodiment and does not include the polarizing plates 21 and 22 and the quarter-wave plates 31A and 31B.

Cameras 33A and 33B are provided with general CCD elements or CMOS elements as image sensors, and 70A and 70B accordingly do not represent the polarization image sensors.

Luminance image data taken and obtained by the first camera 33A are converted into digital signals inside of the first camera 33A and are input in the form of the digital signals into the control device 5 (the image data storage device 54).

Similarly, luminance image data taken and obtained by the second camera 33B are converted into digital signals inside of the second camera 33B and are input in the form of the digital signals into the control device 5 (the image data storage device 54).

The following describes an optical path of first light. As shown in FIG. 12, first light having a wavelength $\lambda 1$ is emitted from the first projection optical system 2A (the first light emitter 11A) toward the interference optical system 3. The traveling direction of light (vector) is inclined at an angle $\theta 1$ to the Z-axis direction.

The first light emitted from the first projection optical system 2A enters the first position P1 of the half mirror HM. Accordingly, this "first position P1 of the half mirror HM" configures the "first input portion" according to the embodiment.

The first light may be any light source having such a coherence length that allows for interference at a sufficient contrast on the image sensor even when a reference mirror is inclined at such an angle that enables the Fourier transform method described later to be performed.

Part (half) of the first light entering the first position P1 of the half mirror HM is reflected by the first face HMa and is emitted toward the reference plane 23, while the remaining part (remaining half) is transmitted through the half mirror HM and is emitted from the second face HMb toward the mounting portion 24.

The first light reflected by the first face HMa of the half mirror HM is radiated to and reflected by the reference plane 23 as reference light. An angle of incidence and an angle of reflection of the reference light with regard to the first light to the reference plane 23 are equal to the angle $\theta 1$ described above.

The reference light with regard to the first light reflected by the reference plane 23 again enters the second position P2 of the half mirror HM. Part (half) of the reference light with regard to the first light entering the second position P2 of the half mirror HM is reflected by the first face HMa and is emitted toward the first imaging system 4A, while the remaining part (remaining half) is transmitted through the half mirror HM and is emitted from the second face HMb toward the second projection optical system 2B.

The first light that is emitted from the first projection optical system 2A, that enters the first position P1 of the half mirror HM and that is transmitted through the half mirror HM is, on the other hand, radiated to and reflected by the work W as measurement light. An angle of incidence and an angle of reflection of the measurement light with regard to the first light to the mounting portion 24 (the work W) are equal to the angle θ1 described above.

The measurement light with regard to the first light reflected by the work W again enters the second position P2 of the half mirror HM. Part (half) of the measurement light with regard to the first light entering the second position P2 of the half mirror HM is transmitted through the half mirror HM and is emitted from the first face HMa toward the first imaging system 4A, while the remaining part (remaining half) is reflected by the second face HMb and is emitted toward the second projection optical system 2B.

Accordingly, at the second position P2 of the half mirror HM, the reference light with regard to the first light reflected by the first face HMa is combined with the measurement light with regard to the first light transmitted to the first face HMa, whereas the reference light with regard to the first light transmitted to the second face HMb is combined with the measurement light with regard to the first light reflected by the second face HMb.

As a result, combined lights generated by combining the reference light with the measurement light with regard to the first light are emitted from the second position P2 of the half mirror HM toward the first imaging system 4A and toward the second projection optical system 2B, as output lights from the interference optical system 3. Accordingly, this "second position P2 of the half mirror HM" configures the "first output portion" according to the embodiment.

The combined light (the reference light and the measurement light) with regard to the first light that enters the second projection optical system 2B is blocked by the second light isolator 12B and becomes unused light.

The combined light (the reference light and the measurement light) with regard to the first light that enter the first imaging system 4A, on the other hand, interferes on the image sensor 70A. The first camera 33A accordingly obtains an interference fringe image by the first light source.

As described above, the reference plane 23 has the angle of 45 degrees with respect to the half mirror HM in the foregoing embodiments but is slightly inclined from 45 degrees in this embodiment. This configuration generates a carrier fringe in the interference fringe image. The direction of inclination of the reference plane (reference mirror) 23 may be a direction of increasing the angle with respect to the half mirror HM to be larger than 45 degrees or a direction of decreasing the angle with respect to the half mirror HM to be smaller than 45 degrees. From the nature of the Fourier transform method, $|\theta 3| \leq \tan^{-1}(\lambda/2D)$, where D denotes a pixel pitch of an image sensor, λ denotes a wavelength used, and θ3 denotes an angle of inclination of the reference plane 23 from 45 degrees. The inclination of the reference plane 23 causes the optical axis JA2 and the optical axis JB2 not to respectively go through the center of the camera 33A and the center of the camera 33B. Since the ray of light has a sufficient width, however, the reference light enters the camera 33A or the camera 33B. In the case where the reference light fails to enter the camera 33A or the camera 33B, adjusting the angle of inclination, increasing the thickness of the ray of light, or the like may be performed to enable the reference light to enter the camera 33A or the camera 33B. The procedure of measurement by the Fourier transform method that intentionally inclines the reference plane 23 to obtain a complex amplitude of the measurement light from the interference fringe image with the carrier fringe generated therein as described above is the publicly known technique (as described in, for example, the paragraphs [0372] to [0377] of JP No. 6271493B) and is not described in detail herein.

The following describes an optical path of second light. As shown in FIG. 12, second light having a wavelength λ2 is emitted from the second projection optical system 2B (the second light emitter 11B) toward the interference optical system 3. The traveling direction of light (vector) is inclined at an angle θ2 (=θ1) to the X-axis direction.

Like the first light, the second light may be any light source having such a coherence length that allows for interference at a sufficient contrast on the image sensor even when the reference plane (reference mirror) 23 is inclined at such an angle that enables the Fourier transform method to be performed.

The second light emitted from the second projection optical system 2B enters the second position P2 of the half mirror HM. Accordingly, this "second position P2 of the half mirror HM" configures the "second input portion" according to the embodiment.

Part (half) of the second light entering the second position P2 of the half mirror HM is transmitted through the half mirror HM and is emitted toward the reference plane 23, while the remaining part (remaining half) is reflected by the second face HMb and is emitted toward the mounting portion 24.

The second light transmitted through the second position P2 of the half mirror HM is radiated to and reflected by the reference plane 23 as reference light. An angle of incidence and an angle of reflection of the reference light with regard to the second light to the reference plane 23 are equal to the angle θ2 described above.

The reference light with regard to the second light reflected by the reference plane 23 again enters the first position P1 of the half mirror HM. Part (half) of the reference light with regard to the second light entering the first position P1 of the half mirror HM is transmitted through the half mirror HM and is emitted from the second face HMb toward the second imaging system 4B, while the remaining part (remaining half) is reflected by the first face HMa and is emitted toward the first projection optical system 2A.

The second light that is emitted from the second projection optical system 2B, that enters the second position P2 of the half mirror HM and that is reflected by the second face HMb is, on the other hand, radiated to and reflected by the work W as measurement light. An angle of incidence and an angle of reflection of the measurement light with regard to the second light to the mounting portion 24 (the work W) are equal to the angle θ2 described above.

The measurement light with regard to the second light reflected by the work W again enters the first position P1 of the half mirror HM. Part (half) of the measurement light with regard to the second light entering the first position P1 of the half mirror HM is reflected by the second face HMb and is emitted toward the second imaging system 4B, while the remaining part (remaining half) is transmitted through the half mirror HM and is emitted from the first face HMa toward the first projection optical system 2A.

Accordingly, at the first position P1 of the half mirror HM, the reference light with regard to the second light reflected by the first face HMa is combined with the measurement light with regard to the second light transmitted to the first face HMa, whereas the reference light with regard to the second light transmitted to the second face HMb is combined with the measurement light with regard to the second light reflected by the second face HMb.

As a result, combined lights generated by combining the reference light with the measurement light with regard to the second light are emitted from the first position P1 of the half mirror HM toward the second imaging system 4B and toward the first projection optical system 2A, as output lights from the interference optical system 3. Accordingly, this "first position P1 of the half mirror HM" configures the "second output portion" according to the embodiment.

The combined light (the reference light and the measurement light) with regard to the second light that enters the first projection optical system 2A is blocked by the first light isolator 12A and becomes unused light.

The combined light (the reference light and the measurement light) with regard to the second light that enter the second imaging system 4B, on the other hand, interferes on the image sensor 70B. The second camera 33B accordingly obtains an interference fringe image by the second light source.

The procedure of measurement by the Fourier transform method that intentionally inclines the reference plane 23 to obtain a complex amplitude of the measurement light from the interference fringe image with the carrier fringe generated therein as described above is the publicly known technique (as described in, for example, the paragraphs [372] to [377] of JP No. 6271493B) and is not described in detail herein.

The luminance image data obtained by respective single imaging processes (the luminance image data with regard to the first light and the luminance image data with regard to the second light) include complex amplitude information of the measurement light required for three-dimensional measurement.

The control device 5 calculates the phase of the measurement light at each wavelength by the Fourier transform method, based on the luminance image data with regard to the first light and the luminance image data with regard to the second light stored in the image data storage device 54. The control device 5 subsequently measures the surface shape of the work W from the obtained phase information of the two wavelengths. Accordingly, the control device 5 performs height measurement at respective measurement positions on the surface of the work W. The measurement results (height data) of the work W thus obtained are stored into the calculation result storage device 55 of the control device 5. The measurement procedure by the Fourier transform method using the two different types of lights having different wavelengths as described above is the publicly known technique (as described in, for example, JP No. 6271493B) and is not described in detail herein.

As described above in detail, in the configuration of this embodiment, there is no section where the traveling directions of the first light and the second light (vectors) from the projection optical systems 2A and 2B to the imaging systems 4A and 4B overlap with each other. Accordingly, the first light and the second light entering the interference optical system 3 do not interfere with each other but are separately emitted from the interference optical system 3 in the completely separated state.

As described above, the configuration of this embodiment enables the first light and the second light to be treated completely separately from each other by only appropriately setting the positions of incidence and the angles of incidence of the first light and the second light relative to the interference optical system 3. This significantly reduces optical members such as polarizing beam splitters and quarter-wave plates required for separation and conversion of the polarized light components (the P-polarized light and the S-polarized light) and simplifies the configuration. Especially, this provides an optical system with omission of a quarter-wave plate which causes polarized light components of two different types of lights having different wavelengths to pass through on an identical optical path in an identical direction.

As a result, this configuration eliminates the influence of a manufacturing error or the like caused by a predetermined optical member and enhances the measurement accuracy.

This configuration enables two different types of lights having close wavelengths to be used as the first light and the second light and further extends the measurement range in three-dimensional measurement. Furthermore, this configuration enables imaging of the output light with regard to the first light to be performed simultaneously with imaging of the output light with regard to the second light and thereby improves the measurement efficiency.

Additionally, this embodiment does not use the polarization image sensors as the imaging elements of the cameras 33A and 33B. This further simplifies the configuration.

A modified configuration may include the objective lenses L1 and L2, the projection lenses L3A and L3B and the imaging lenses L4A and L4B like the fifth embodiment described above, in addition to the configuration of this embodiment.

The present disclosure is not limited to the description of the above embodiments but may be implemented, for example, by configurations described below. The present disclosure may also be naturally implemented by applications and modifications other than those illustrated below.

(a) The above respective embodiments do not specifically refer to concrete examples of the work W (the type of the work such as the shape, the dimensions and the material). The measurement object or the object to be measured is, for example, solder paste printed on a printed circuit board or a solder bump formed on a wafer substrate. A modification may be configured to measure any measurement object different from these examples. An inspection device configured to check the good/poor quality of the measurement object according to a good/poor quality judgment criterion set in advance may be provided with the three-dimensional measurement device 1.

(b) The arrangements and configurations of the projection optical systems 2A and 2B, the interference optical system 3 and the imaging systems 4A and 4B are not limited to the respective embodiments described above.

(b-1) For example, in the respective embodiments described above, the angle of incidence $\theta 1$ and the angle of reflection $\theta 1$ of the reference light with regard to the first light to the reference plane 23, the angle of incidence $\theta 1$ and the angle of reflection $\theta 1$ of the measurement light with regard to the first light to the mounting portion 24 (the work W), the angle of incidence $\theta 2$ and the angle of reflection $\theta 2$ of the reference light with regard to the second light to the reference plane 23 and the angle of incidence $\theta 2$ and the angle of reflection $\theta 2$ of the measurement light with regard to the second light to the mounting portion 24 (the work W) are set equal to one another ($\theta 1 = \theta 2$).

This configuration is, however, not essential. A modified configuration may set the respective angles $\theta 1$ with regard to the first light and the respective angles $\theta 2$ with regard to the second light to different angles.

(b-2) The respective embodiments described above are configured to take images of one work from different angles by using the two imaging systems 4A and 4B. From the standpoint of improving the measurement accuracy, the above angles θ1 and θ2 to the axis perpendicular to the work W (Z axis) may be reduced and images of the work W may be taken from angles as equal as possible.

(b-3) The respective angles θ1 with regard to the first light and the respective angles θ2 with regard to the second light may be set such that the angles of incidence of the first light and the second light to the half mirror HM are smaller than critical angles of total reflection of the first light and the second light.

(b-4) The combination of the positions of the "first input portion" and the "second input portion" of the optical unit, the positions of the "first output portion" and the "second output portion" of the optical unit, and the respective angles θ1 with regard to the first light and the respective angles θ2 with regard to the second light is not limited to those described in the above respective embodiments. Any combination may be employed as long as the combination is at least configured to prevent the traveling direction (vector) of the measurement light with regard to the first light toward the work W and the traveling direction (vector) of the measurement light with regard to the second light toward the work W from overlapping with each other.

Figure 13:
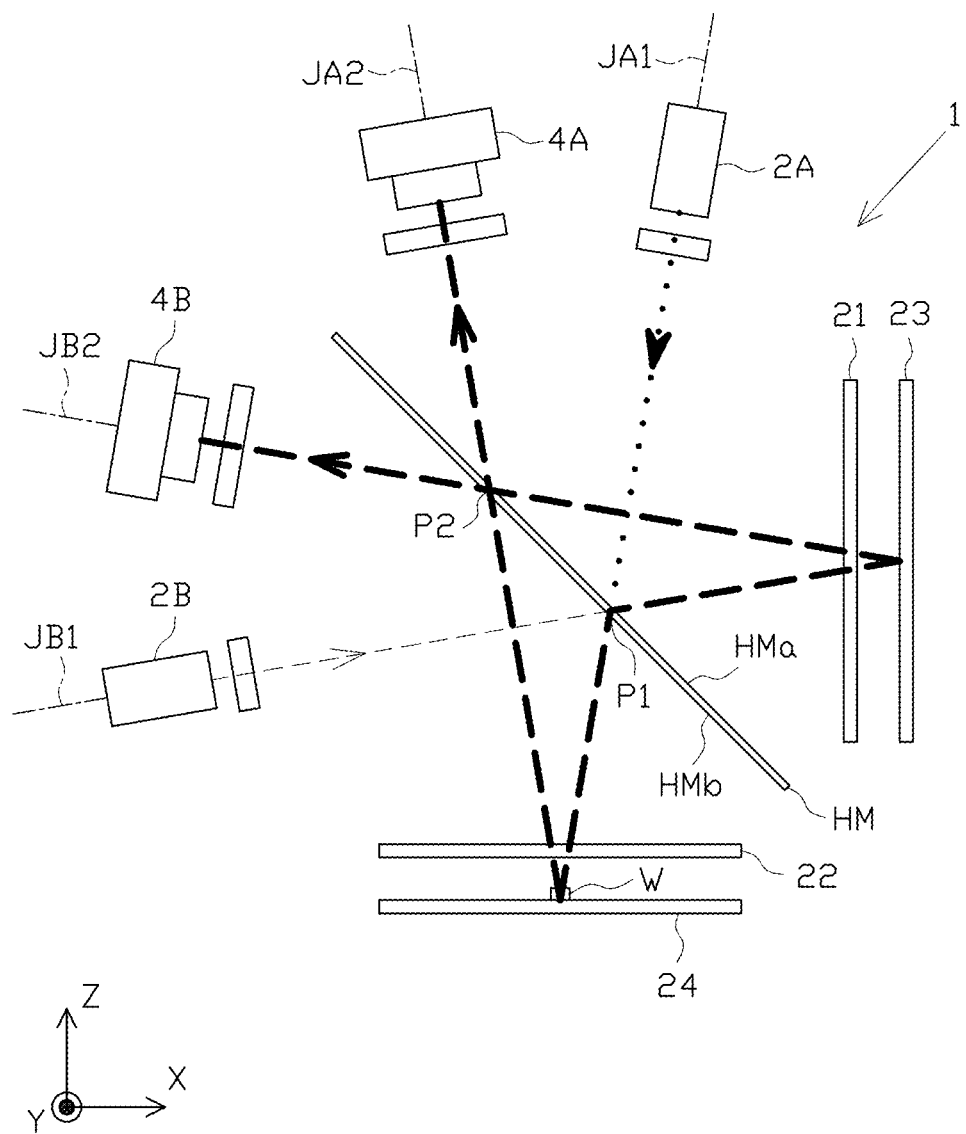
FIG. 13 is an optical path diagram illustrating one example in the case where traveling directions of measurement light and reference light with regard to the first light overlap with traveling directions of measurement light and reference light with regard to the second light.

More specifically, employable is any combination other than the combinations that cause the traveling directions (vectors) of the measurement light and the reference light with regard to the first light toward the work W and toward the reference plane 23 to overlap with the traveling directions (vectors) of the measurement light and the reference light with regard to the second light toward the work W and toward the reference plane 23, as shown in FIG. 13 (more specifically, as shown by thick broken lines).

For example, in the respective embodiments described above, the optical path of the first light and the optical path of the second light are set in an identical XZ plane. This is, however, not essential. A modified configuration may be set such that at least one of the optical path of the measurement light with regard to the first light toward the work W and the optical path of the measurement light with regard to the second light toward the work W is along the Y-axis direction, in planar view in the Z-axis direction.

In other words, the modified configuration may be set such that at least one of the optical path of the measurement light with regard to the first light toward the work W and the optical path of the measurement light with regard to the second light toward the work W has an inclination in the Y-axis direction (front direction or rear direction) relative to the Z-axis direction.

Furthermore, a modified configuration may be set such that the optical path of the measurement light with regard to the first light toward the work W overlaps with the optical path of the measurement light with regard to the second light toward the work W and that the angle of incidence θ1 of the measurement light with regard to the first light is different from the angle of incidence θ2 of the measurement light with regard to the second light, in planar view in the Z-axis direction.

(c) The configurations relating to the interference optical system (the predetermined optical system) and the optical unit are not limited to those described in the above respective embodiments.

(c-1) For example, the optical unit is not limited to the half mirror HM or the beam splitter 20 used in the above respective embodiments but may be another optical member configured to split a predetermined incident light into two split lights.

Figure 14A:
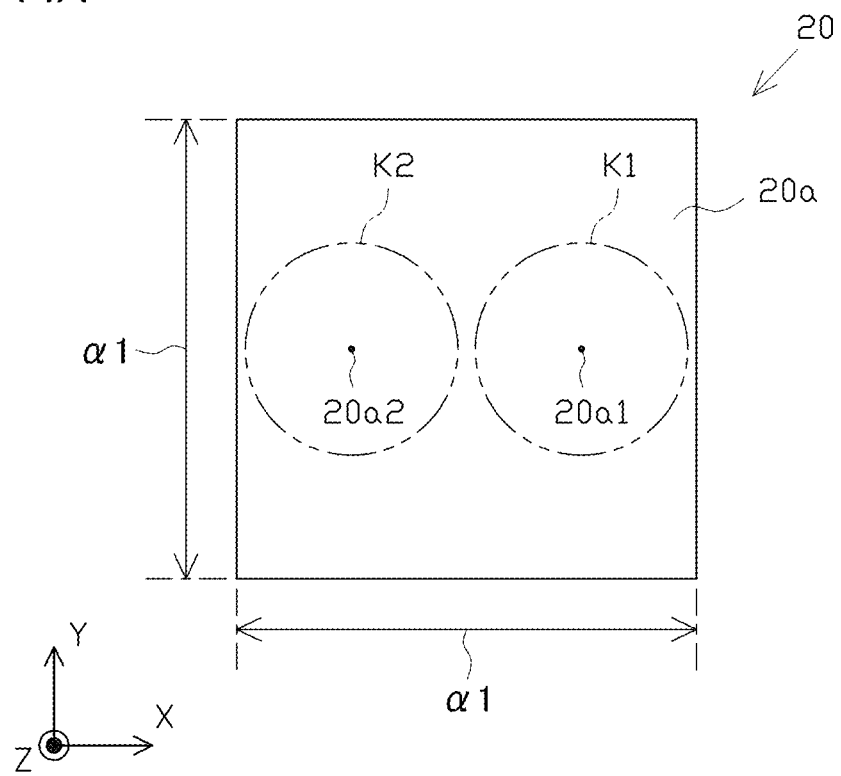
FIG. 14A is a schematic diagram illustrates the state that a first position which an incident light of the first light enters and a second position which an emission light of the first light is emitted from are aligned in a direction parallel to one side of a first face of a beam splitter.

(c-2) As shown in FIG. 14A, in the sixth embodiment described above, the first position 20a1 which an incident light K1 of the first light emitted from the first projection optical system 2A enters and the second position 20a2 which an emission light K2 of the first light (combined light of the reference light and the measurement light with regard to the first light) is emitted from, on the first face 20a of the beam splitter 20 are set to be aligned in a direction parallel to one side of the first face 20a in a square shape.

Figure 14B:
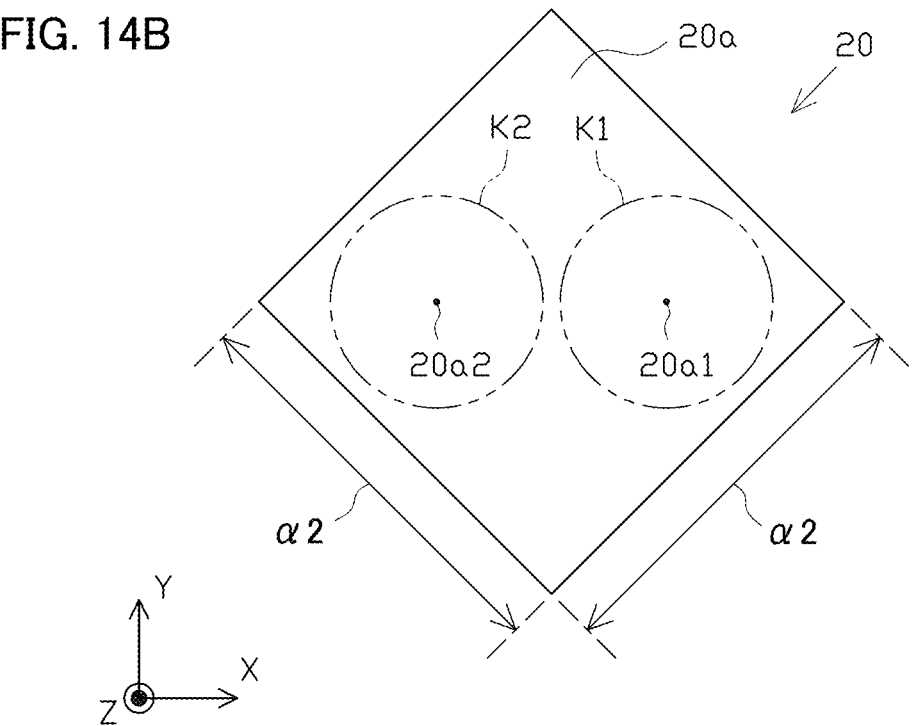
FIG. 14B is a schematic diagram illustrating the state that the first position which the incident light of the first light enters and the second position which the emission light of the first light is emitted from are aligned in a diagonal direction of the first face of the beam splitter.
Figure 16:
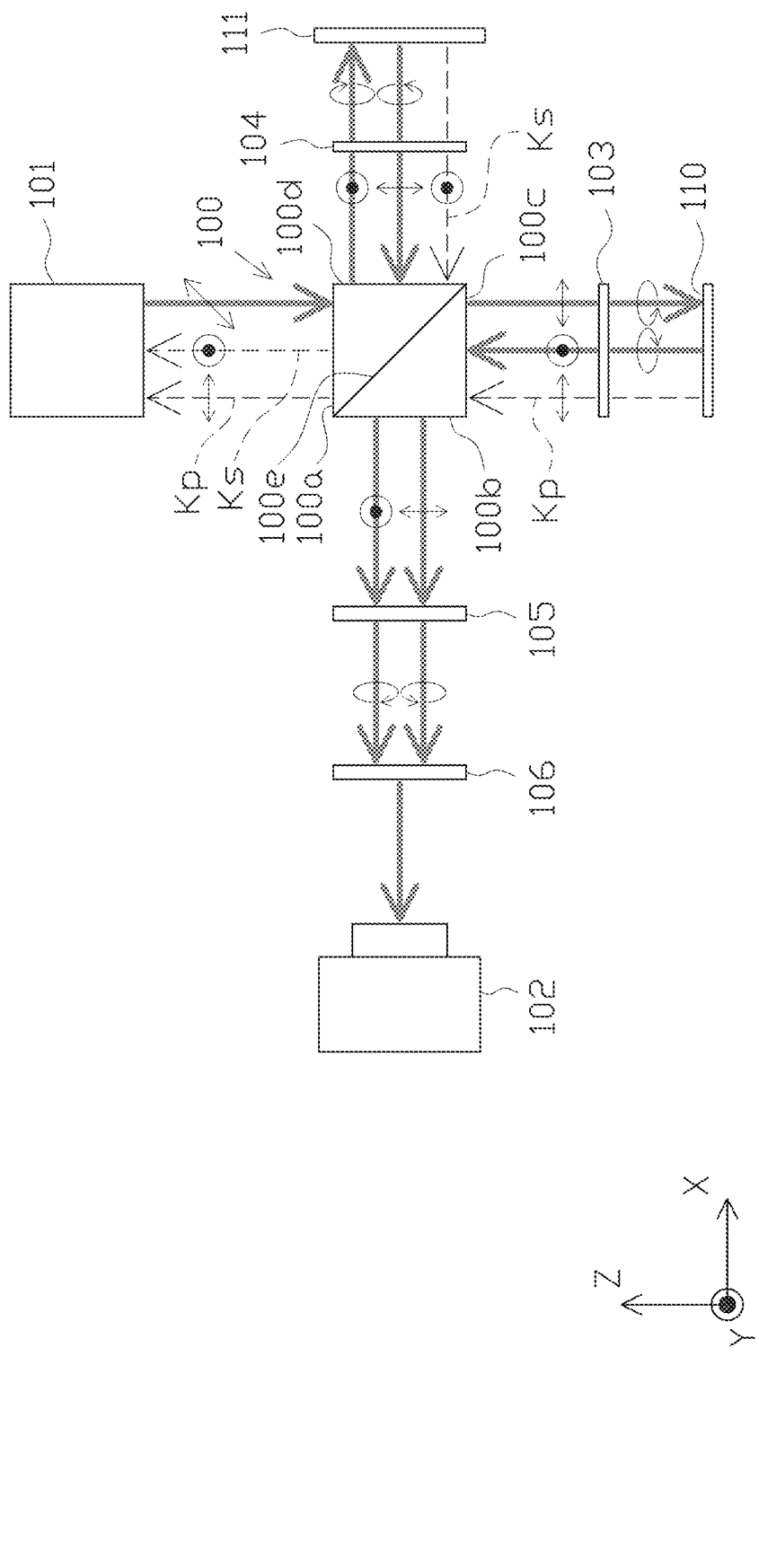
FIG. 16 is an optical path diagram illustrating optical paths of lights in a prior art three-dimensional measurement device.

This configuration may be replaced by a modified configuration that the first position 20a1 which the incident light K1 of the first light enters and the second position 20a2 which the emission light K2 of the first light is emitted from, on the first face 20a of the beam splitter 20 are set to be aligned in a diagonal direction of the first face 20a in the square shape as shown in FIG. 14B.

As understood from the comparison between FIG. 14A and FIG. 14B, unless the diameters (widths) of the incident light K1 and of the emission line K2 of the first light change, he configuration shown in FIG. 14B (the configuration that the first position 20a1 and the second position 20a2 are aligned in the diagonal direction of the first face 20a) is allowed to use the smaller beam splitter 20 having the shorter length of one side of the first face 20a (α1>α2). As a result, this achieves downsizing of the device.

This modified configuration is not limited to the above sixth embodiment (the beam splitter 20) but may also be employed in any of the first to the fifth embodiments using the rectangular plate-like half mirror HM to set the first position P1 which the incident light K1 of the first light enters and the second position P2 which the emission line K2 of the first light is emitted from, such as to be aligned in a diagonal direction of the half mirror HM.

(d) The configuration relating to the irradiation unit is not limited to the configuration of the projection optical systems 2A and 2B described above.

(d-1) For example, the above respective embodiments illustrate the configuration that the light having the wavelength λ1=1500 nm is radiated from the first projection optical system 2A and that the light having the wavelength λ2=1503 nm is radiated from the second projection optical system 2B. The wavelengths of the respective lights are, however, not limited to this example. In this regard, however, the difference in wavelength between the two lights may be minimized in order to extend the measurement range.

(d-2) The light emitters 11A and 11B in the above respective embodiments employ the laser light sources and are configured to emit the laser lights. This is, however, not essential, but another configuration may be employed. The configuration employable is required to emit light having a high coherence (coherent light) such as to make at least interference.

For example, a modified configuration may enhance the coherence and emit the coherent light by combining an incoherent light source such as an LED light source with a bandpass filter or a special filter that allows for transmission of only a specific wavelength.

(e) The configurations relating to the imaging unit and the imaging element are not limited to those described in the above respective embodiments.

(e-1) For example, the above respective embodiments employ the CCD image sensor as one example of the light-receiving element array 71. The light-receiving element array 71 is, however, not limited to this example but may have a semiconductor element structure, for example, a CMOS image sensor.

(e-2) The configuration of the polarization image sensors 70A and 70B in the above respective embodiments includes the light-receiving element array 71, the polarizer array 72 and the microlens array 73. This configuration is, however, not essential. For example, a modified configuration may omit the microlens array 73.

(e-3) The array of the polarizers 75 in the polarizer array 72 is not limited to those described in the above respective embodiments.

For example, in the configurations of the above respective embodiments, the four different polarizers 75a, 75b, 75c and 75d having the set angles of the transmission axes that differ by 45 degrees each are arranged in the predetermined sequence. In a modified configuration, the four different polarizers 75a, 75b, 75c and 75d may be arranged in a different sequence.

In another modified configuration, three different polarizers having different transmission axis angles may be arranged in a predetermined sequence. For example, in a modified configuration, three different polarizers having set angles of the transmission axes that differ by 60 degrees or 45 degrees each may be arranged in a predetermined sequence.

(f) The configuration relating to the phase shift of changing a phase difference between the reference light and the measurement light is not limited to those described in the above respective embodiments.

(f-1) In the respective embodiments described above, the polarization image sensors 70A and 70B where the four different polarizers 75 having different set angles of transmission axes by 45 degrees each are arranged in a predetermined array to be one-to-one mapping to the respective light-receiving elements 74, are used as the imaging elements of the cameras 33A and 33B. This configuration enables a plurality of different luminance data required for height measurement of the work W by the phase shift method to be simultaneously obtained by one single imaging operation using each of the cameras 33A and 33B.

This configuration is, however, not essential. For example, a modified configuration may use general image sensors with omission of the polarizer array 72, as the imaging elements, in place of the polarization image sensors 70A and 70B and may be provided with polarizing plates configured to change the direction of the transmission axis in the imaging systems 4A and 4B.

These polarizing plates allow for selective transmission of the respective components of the first light and of the second light converted into circularly polarized lights by the quarter-wave plates 31A and 31B and enable the reference light components and the measurement light components of the first light and of the second light having different rotating directions to interfere with each other with regard to a specific phase.

More specifically, the first imaging system 4A may include the quarter-wave plate 31A configured to convert the combined light (the reference light component and the measurement light component) with regard to the first light into circularly polarized lights, a rotary first polarizing plate configured to allow for selective transmission of a predetermined component of the light transmitted through the quarter-wave plate 31A (to cause the reference light and the measurement light to interfere with each other), and the first camera 33A configured to take images of the light transmitted through the first polarizing plate. The second imaging system 4B may include the quarter-wave plate 31B configured to convert the combined light (the reference light component and the measurement light component) with regard to the second light into circularly polarized lights, a rotary second polarizing plate configured to allow for selective transmission of a predetermined component of the light transmitted through the quarter-wave plate 31B (to cause the reference light and the measurement light to interfere with each other), and the second camera 33B configured to take images of the light transmitted through the second polarizing plate.

Another employable configuration to perform the phase shift may use a piezoelectric element or the like to move the reference plane 23 in a normal direction of the reference plane 23 and thereby physically change the optical path length.

The configuration of performing the phase shift by changing the transmission axis direction of the polarizing plate and the configuration of performing the phase shift by moving the reference plane 23 described above, however, require imaging operations to be performed at a plurality of timings, in order to obtain all the image data required for three-dimensional measurement. Accordingly, from the standpoint of shortening the imaging time, the configuration may be employed where all the image data are taken at one single timing like the respective embodiments described above. Moreover, these configurations are affected by the fluctuation of the air, the vibration and the like between the timings and are thus likely to have the lower measurement accuracy, as well as the longer measurement time.

(f-2) In the respective embodiments described above, the height measurement of the work W by the phase shift method may be performed, based on the luminance image data of the four different interfering lights having the phases that differ by 90 degrees each, with regard to the first light and the second light (the luminance image data with regard to the first light and the luminance image data with regard to the second light). The number of phase shifts and the amount of phase shift are, however, not limited to these examples. For example, a modification may be configured to perform height measurement of the work W by the phase shift method, based on luminance image data of three different interfering lights having phases that differ by 120 degrees (or 90 degrees) each.

Another modified configuration may perform three-dimensional measurement by another method different from the phase shift method and the Fourier transform method.

(g) In the seventh embodiment described above (FIG. 12), the angle of inclination θ3 of the reference plane 23 is expressed as the angle of rotation about the Y axis. This angle of inclination is only one example. The actual angle of inclination may be an angle about the Z axis or may be a summed angle about the Y axis and about the Z axis.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . three-dimensional measurement device, 2A . . . first projection optical system, 2B . . . second projection optical system, 3 . . . interference optical system, 4A . . . first imaging system, 4B . . . second imaging system, 5 . . . control device, 11A . . . first light emitter, 11B . . . second light emitter, 21, 22 . . . polarizing plates, 23 . . . reference plane 24 . . . mounting portion, 31A . . . quarter-wave plate, 31B . . . quarter-wave plate, 33A . . . first camera, 33B . . . second camera, 70A . . . polarization image sensor, 70B . . . polarization image sensor, HM . . . half mirror, W . . . work

What is claimed is:

1. A three-dimensional measurement device, comprising:
   an optical system:
      comprises an optical device that splits an incident light into two split lights,
      irradiates a measurement object with a measurement light that is at least part of one of the two split lights,
      irradiates a reference plane with a reference light that is at least part of another of the two split lights, and
      combines at least part of the measurement light reflected by the measurement object with at least part of the reference light reflected by the reference plane to emit a combined light;
   a first light emitter that emits a first light that has a first wavelength and enters a first input portion of the optical device, wherein
      the measurement object is irradiated with a first measurement light and the reference plane is irradiated with a first reference light once the first light enters the first input portion;
   a second light emitter that emits a second light that has a second wavelength and enters a second input portion of the optical device, wherein
      the measurement object is irradiated with a second measurement light and the reference plane is irradiated with a second reference light once the second light enters the second input portion;
   a first imaging device that takes an image of an output light that is output from a first output portion of the optical device once the first light enters the first input portion, and obtains first image data;
   a second imaging device that takes an image of an output light that is output from a second output portion of the optical device once the second light enters the second input portion, and obtains second image data; and
   a control device that executes three-dimensional measurement of the measurement object, based on the first and second image data obtained by the first imaging device and by the second imaging device, wherein
   the optical device and the first and second light emitters are disposed such that:
      a traveling direction of the first measurement light output from the optical device and directed to the measurement object is different from a traveling direction of the second measurement light output from the optical device and directed to the measurement object,
      a traveling direction of the first reference light output from the optical device and directed to the reference plane is different from a traveling direction of the second reference light output from the optical device and directed to the reference plane,
      a traveling direction of the first measurement light reflected by the measurement object and directed to the optical device is different from a traveling direction of the second measurement light reflected by the measurement object and directed to the optical device, and
      a traveling direction of the first reference light reflected by the reference plane and directed to the optical device is different from a traveling direction of the second reference light reflected by the reference plane and directed to the optical device, wherein
   the optical device is configured to:
      combine part of the first measurement light reflected by the measurement object with part of the first reference light reflected by the reference plane to emit a combined light from the first output portion, and
      combine part of the second measurement light reflected by the measurement object with part of the second reference light reflected by the reference plane to emit a combined light from the second output portion.

2. The three-dimensional measurement device according to claim 1, further comprising:
   a first polarizing plate that:
      is disposed between the optical device and the reference plane,
      transmits a first reference polarized light once the first reference light enters the first polarized plate, and
      transmits a second reference polarized light once the second reference light enters the first polarized plate;
   a second polarizing plate that:
      is disposed between the optical device and the measurement object,
      transmits a first measurement polarized light once the first measurement light enters the second polarized plate, and
      transmits a second measurement polarized light once the second measurement light enters the second polarized plate;
   a first quarter-wave plate that:
      is disposed between the first output portion of the optical device and the first imaging device, and
      converts the first reference polarized light and the first measurement polarized light into first circularly polarized lights; and
   a second quarter-wave plate that:
      is disposed between the second output portion of the optical device and the second imaging device, and
      converts the second reference polarized light and the second measurement polarized light into second circularly polarized lights.

3. The three-dimensional measurement device according to claim 2, wherein
   an optical path of the first measurement light output from the optical device and directed to the measurement object and an optical path of the second measurement light output from the optical device and directed to the measurement object are symmetric about a predetermined axis perpendicular to the measurement object, when viewed in a direction of the predetermined axis, and
   an optical path of the first reference light output from the optical device and directed to the reference plane and an optical path of the second reference light output from the optical device and directed to the reference plane are symmetric about a predetermined axis perpendicular to the reference plane, when viewed in a direction of the predetermined axis.

4. The three-dimensional measurement device according to claim 3, wherein
an incident angle of the first measurement light with respect to the measurement object is equal to an incident angle of the second measurement light with respect to the measurement object, and
an incident angle of the first reference light with respect to the reference plane is equal to an incident angle of the second reference light with respect to the reference plane.

5. The three-dimensional measurement device according to claim 4, wherein the optical device is a half mirror.

6. The three-dimensional measurement device according to claim 3, wherein the optical device is a half mirror.

7. The three-dimensional measurement device according to claim 2, wherein
an incident angle of the first measurement light with respect to the measurement object is equal to an incident angle of the second measurement light with respect to the measurement object, and
an incident angle of the first reference light with respect to the reference plane is equal to an incident angle of the second reference light with respect to the reference plane.

8. The three-dimensional measurement device according to claim 7, wherein the optical device is a half mirror.

9. The three-dimensional measurement device according to claim 2, wherein the optical device is a half mirror.

10. The three-dimensional measurement device according to claim 1, wherein
an optical path of the first measurement light output from the optical device and directed to the measurement object and an optical path of the second measurement light output from the optical device and directed to the measurement object are symmetric about a predetermined axis perpendicular to the measurement object, when viewed in a direction of the predetermined axis, and
an optical path of the first reference light output from the optical device and directed to the reference plane and an optical path of the second reference light output from the optical device and directed to the reference plane are symmetric about a predetermined axis perpendicular to the reference plane, when viewed in a direction of the predetermined axis.

11. The three-dimensional measurement device according to claim 10, wherein
an incident angle of the first measurement light with respect to the measurement object is equal to an incident angle of the second measurement light with respect to the measurement object, and
an incident angle of the first reference light with respect to the reference plane is equal to an incident angle of the second reference light with respect to the reference plane.

12. The three-dimensional measurement device according to claim 11, wherein the optical device is a half mirror.

13. The three-dimensional measurement device according to claim 10, wherein the optical device is a half mirror.

14. The three-dimensional measurement device according to claim 1, wherein
an incident angle of the first measurement light with respect to the measurement object is equal to an incident angle of the second measurement light with respect to the measurement object, and
an incident angle of the first reference light with respect to the reference plane is equal to an incident angle of the second reference light with respect to the reference plane.

15. The three-dimensional measurement device according to claim 14, wherein the optical device is a half mirror.

16. The three-dimensional measurement device according to claim 1, wherein the optical device is a half mirror.

17. The three-dimensional measurement device according to claim 1,
the control device executes three-dimensional measurement of the measurement object by a Fourier transform method that obtains a complex amplitude of each of the first and second measurement lights, based on the first and second image data each obtained by taking an image of a carrier fringe that is generated in a predetermined positional relationship between the optical device and the reference plane.

* * * * *